US012656320B2

(12) United States Patent
Briggs, IV et al.

(10) Patent No.: US 12,656,320 B2
(45) Date of Patent: Jun. 16, 2026

(54) UT SENSOR INTERFACE FOR SCANNING COMPLEX ENVIRONMENTS

(71) Applicant: APPLIED IMPACT ROBOTICS INC, Sterling, VA (US)

(72) Inventors: Fred Melvelle Briggs, IV, Ashburn, VA (US); Brandon Pollett Wernick, Rockville, MD (US); Nathan Alexander Lloyd, Frederick, MD (US)

(73) Assignee: APPLIED IMPACT ROBOTICS INC, Sterling, VA (US)

( * ) Notice: Subject to any disclaimer, the term of this patent is extended or adjusted under 35 U.S.C. 154(b) by 482 days.

(21) Appl. No.: 18/324,818

(22) Filed: May 26, 2023

(65) Prior Publication Data

US 2023/0393101 A1 Dec. 7, 2023

Related U.S. Application Data

(60) Provisional application No. 63/347,760, filed on Jun. 1, 2022.

(51) Int. Cl.
*G01N 29/28* (2006.01)
*G01N 29/07* (2006.01)
*G01N 29/22* (2006.01)

(52) U.S. Cl.
CPC .............. *G01N 29/28* (2013.01); *G01N 29/07* (2013.01); *G01N 29/226* (2013.01); *G01N 2291/02854* (2013.01); *G01N 2291/2638* (2013.01)

(58) Field of Classification Search
CPC ...... G01N 29/28; G01N 29/07; G01N 29/226; G01N 2291/02854; G01N 2291/2638; G01N 29/225; G01N 29/265; G01N 29/262
See application file for complete search history.

(56) References Cited

U.S. PATENT DOCUMENTS

| | | | |
|---|---|---|---|
| 1,388,545 A | 8/1921 | Bohan | |
| 3,330,368 A | 7/1967 | Baran et al. | |
| 3,800,889 A | 4/1974 | Bauer | |
| 4,232,903 A | 11/1980 | Welling et al. | |
| 4,338,043 A | 7/1982 | Biancale et al. | |

(Continued)

FOREIGN PATENT DOCUMENTS

| | | |
|---|---|---|
| CN | 113404779 A | 9/2021 |
| EP | 2 045 600 A1 | 4/2009 |

(Continued)

OTHER PUBLICATIONS

International Searching Authority; Notification of International Search Report and Written Opinion; International Application No. PCT/US2023/023929 mailed Sep. 20, 2023, 12 pages.

(Continued)

*Primary Examiner* — Tarun Sinha
(74) *Attorney, Agent, or Firm* — The Marbury Law Group, PLLC

(57) ABSTRACT

A UT scanner interface may include a main body that includes an inner chamber including a UT scanner facing toward an opening on a bottom side, a couplant injection port, and a fluid evacuation port. During operations, a couplant is injected into the inner chamber via the couplant injection port while couplant and any contaminants may be removed from the inner chamber via the fluid evacuation port.

30 Claims, 13 Drawing Sheets

(56) References Cited

U.S. PATENT DOCUMENTS

| | | | | |
|---|---|---|---|---|
| 4,817,653 | A | * | 4/1989 | Krajicek ............... B08B 9/0933 |
| | | | | 239/722 |
| 4,974,688 | A | | 12/1990 | Helton |
| 5,454,269 | A | * | 10/1995 | Vogt ....................... G01N 29/28 |
| | | | | 73/644 |
| 5,850,884 | A | | 12/1998 | Rodger et al. |
| 6,016,701 | A | * | 1/2000 | McClelland ......... G01N 29/265 |
| | | | | 73/620 |
| 6,017,400 | A | | 1/2000 | Clark et al. |
| 6,138,515 | A | | 10/2000 | Moufle et al. |
| 7,284,434 | B1 | * | 10/2007 | Fleming ................. G01N 29/07 |
| | | | | 73/644 |
| 8,087,298 | B1 | * | 1/2012 | DiMambro .......... G01N 29/262 |
| | | | | 73/644 |
| 8,239,992 | B2 | * | 8/2012 | Schnittman ............. B60L 53/14 |
| | | | | 15/52.1 |
| 2004/0226747 | A1 | | 11/2004 | Stegmaier et al. |
| 2009/0282923 | A1 | * | 11/2009 | Havira ................... G01N 29/28 |
| | | | | 73/636 |
| 2017/0292329 | A1 | | 10/2017 | Hayik |
| 2018/0119868 | A1 | | 5/2018 | Souvestre |
| 2020/0338943 | A1 | | 10/2020 | Tran |
| 2021/0382014 | A1 | * | 12/2021 | Xu ..................... G01N 29/2487 |
| 2023/0142564 | A1 | * | 5/2023 | Faucher ................ G01N 29/28 |
| | | | | 73/618 |

FOREIGN PATENT DOCUMENTS

| | | |
|---|---|---|
| JP | 2011-002320 A | 1/2011 |
| KR | 10-2231281 B1 | 3/2021 |
| WO | 2021/195756 A1 | 10/2021 |

OTHER PUBLICATIONS

Continuation U.S. Appl. No. 18/307,292 filed Apr. 26, 2023, Inventors: Fred Melvelle Briggs, et al.

U.S. Appl. No. 17/543,344 filed Dec. 6, 2021, Inventors: Fred Melvelle Briggs, et al.

International Searching Authority; Notification of International Search Report and Written Opinion in related International Application No. PCT/US2022/028560; mailed Aug. 23, 2022; 11 pages.

International Preliminary Report of Patentability; International Application No. PCT/US2023/023929, issued Nov. 7, 2024, mailed Dec. 12, 2024, 8 pages.

* cited by examiner

100

100

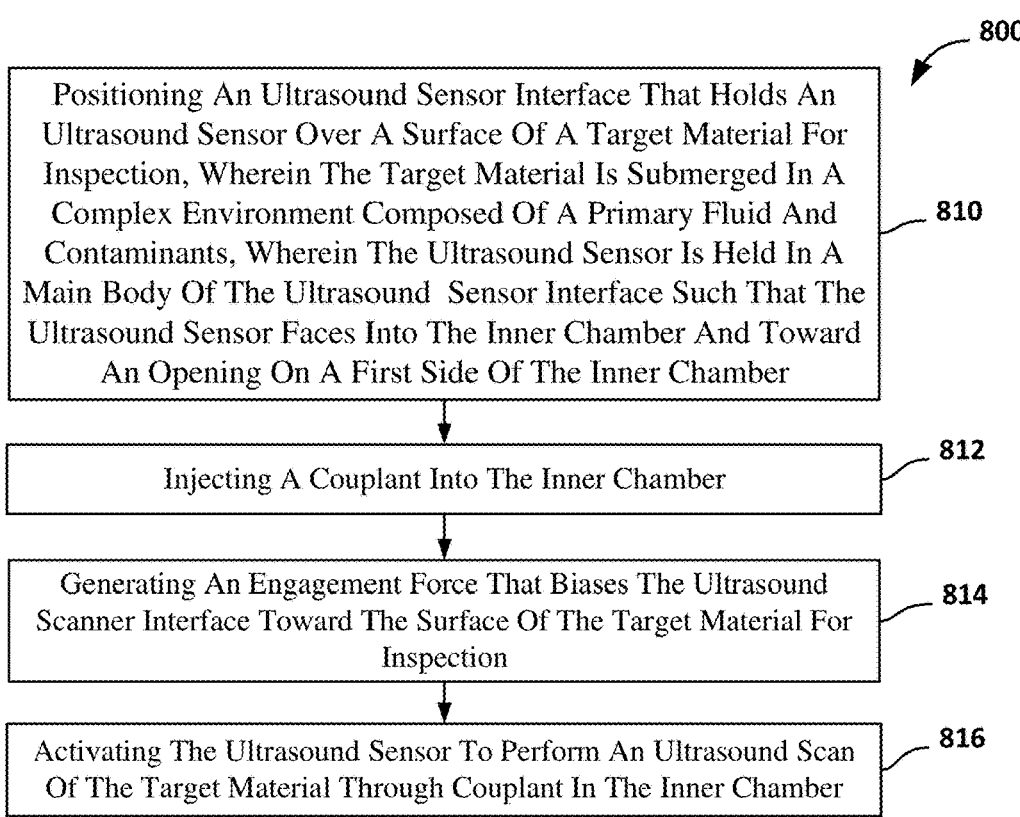

800

Positioning An Ultrasound Sensor Interface That Holds An Ultrasound Sensor Over A Surface Of A Target Material For Inspection, Wherein The Target Material Is Submerged In A Complex Environment Composed Of A Primary Fluid And Contaminants, Wherein The Ultrasound Sensor Is Held In A Main Body Of The Ultrasound Sensor Interface Such That The Ultrasound Sensor Faces Into The Inner Chamber And Toward An Opening On A First Side Of The Inner Chamber — 810

Injecting A Couplant Into The Inner Chamber — 812

Generating An Engagement Force That Biases The Ultrasound Scanner Interface Toward The Surface Of The Target Material For Inspection — 814

Activating The Ultrasound Sensor To Perform An Ultrasound Scan Of The Target Material Through Couplant In The Inner Chamber — 816

FIG. 8A

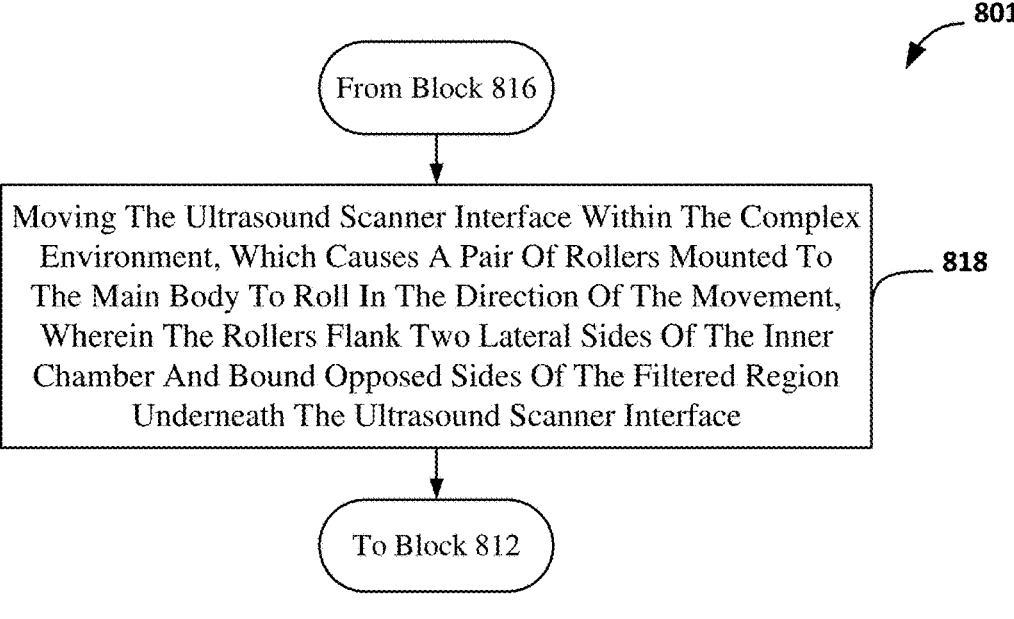

801

From Block 816

Moving The Ultrasound Scanner Interface Within The Complex Environment, Which Causes A Pair Of Rollers Mounted To The Main Body To Roll In The Direction Of The Movement, Wherein The Rollers Flank Two Lateral Sides Of The Inner Chamber And Bound Opposed Sides Of The Filtered Region Underneath The Ultrasound Scanner Interface — 818

To Block 812

FIG. 8B

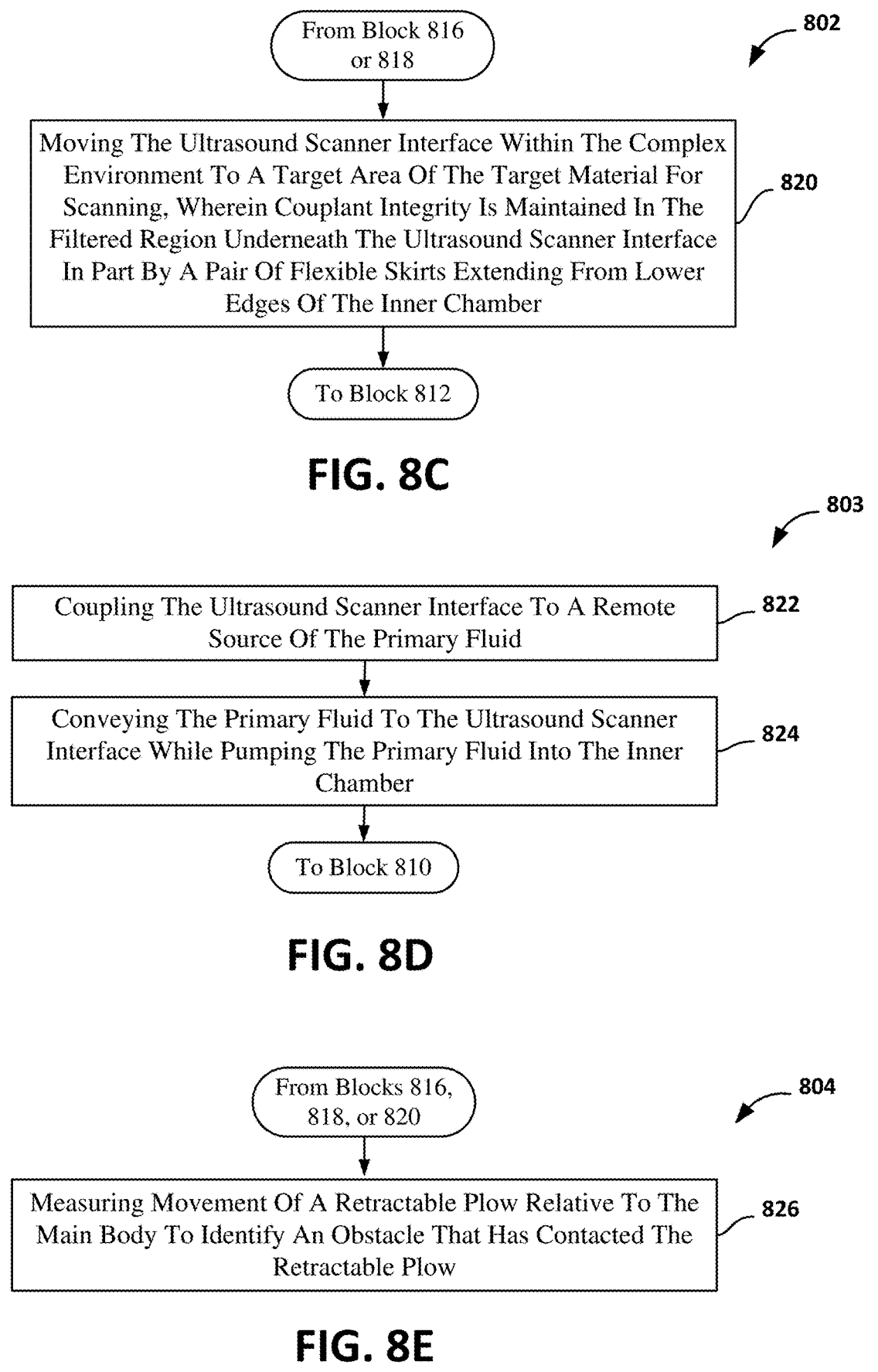

From Block 816
or 818

_802

Moving The Ultrasound Scanner Interface Within The Complex Environment To A Target Area Of The Target Material For Scanning, Wherein Couplant Integrity Is Maintained In The Filtered Region Underneath The Ultrasound Scanner Interface In Part By A Pair Of Flexible Skirts Extending From Lower Edges Of The Inner Chamber

820

To Block 812

Coupling The Ultrasound Scanner Interface To A Remote Source Of The Primary Fluid

822

Conveying The Primary Fluid To The Ultrasound Scanner Interface While Pumping The Primary Fluid Into The Inner Chamber

824

To Block 810

FIG. 8D

From Blocks 816, 818, or 820

_804

Measuring Movement Of A Retractable Plow Relative To The Main Body To Identify An Obstacle That Has Contacted The Retractable Plow

UT SENSOR INTERFACE FOR SCANNING COMPLEX ENVIRONMENTS

CROSS REFERENCE TO RELATED APPLICATION

This application claims priority to U.S. Provisional Patent Application No. 63/347,760, filed Jun. 1, 2022, entitled "Ultrasound Interface for Ultrasonic Scanning in Complex Environments," the entire contents of which are incorporated herein by reference.

BACKGROUND

Ultrasonic transducers are often used to perform non-destructive testing (NDT) on metal plates. Using ultrasound for NDT is also known as simply "UT." UT typically uses ultrasound sensors that emit an echo that gets reflected off the boundary of two materials and is used to detect and/or test the thickness of materials. Knowing the original thickness of a plate and measuring the current thickness may enable the detection of corrosion, if the current thickness is less than the original thickness. Thus, using ultrasound sensors to measure the thickness of metal plates has proven to be a highly accurate and reliable method for determining corrosion.

Ultrasound sensors are usually held within inches of a material being scanned, thus leaving a gap between the ultrasound sensor and the material. Generally, the gap is filled with a couplant, which is a material that facilitates the transmission of ultrasonic energy from the UT sensor into the material being scanned. The couplant is necessary to reduce acoustic impedance mismatch between the medium carrying the ultrasound waves and the test specimen. UT sensors require a clean surface and clear consistent couplant to ensure good readings. If materials, such as sand and particulates, are present in the couplant or on the surface being scanned, such materials may reflect the UT signals and distort or completely obfuscate the material that is being tested. In addition, when passing UT signals through mixed mediums, the velocity of the UT signals through that material can vary, which similarly causes measurement problems. If the velocity of the UT signals through the couplant is unknown, then the timing of the reflection becomes unknown, which causes uncertainty for the thickness measurements of scanned materials.

SUMMARY

Various aspects include devices, systems, and methods for ultrasound scanning in complex environments, particularly with a UT scanner interface. The ultrasound scanner interface may include a main body that includes an inner chamber, a couplant injection port, and a fluid evacuation port. The inner chamber includes an opening on a bottom side, and the main body is configured to hold a UT scanner facing into the inner chamber and toward the opening on the bottom side. The couplant injection port may be configured to inject a couplant into the inner chamber. The fluid evacuation port may be configured to remove fluid from the inner chamber, wherein the fluid removed from the inner chamber includes at least some of the couplant injected into the inner chamber.

In some aspects, the couplant injection port may be coupled to a series of inlet ports disposed along an outer edge of the opening on the bottom side and configured to distribute couplant supplied from the couplant injection port into the inner chamber. The series of inlet ports may be disposed outside the inner chamber. The series of inlet ports may face in the same direction as the ultrasound scanner. The series of inlet ports may be disposed on opposite sides of the inner chamber. The fluid evacuation port may be coupled to a series of outlet ports disposed adjacent the inner chamber and configured to distribute couplant supplied to the inner chamber. The series of outlet ports may be distributed along opposing sides of the ultrasound scanner within the inner chamber.

In some aspects, the ultrasound scanner interface may include a pair of rollers disposed on opposed sides of the opening on the bottom side, with each of the pair of rollers configured to engage a surface for scanning by the ultrasound scanner. The main body may further include a pair of roller cavities disposed on opposite sides of the inner chamber, each configured to house one of the pairs of rollers. The main body may further include a fluid supply port configured to supply the pair of roller cavities with fluid for lubricating the pair of rollers. A lower edge of at least one side wall of the main body may include a flexible skirt configured to at least partially shield fluid or sediment from entering the inner chamber. The main body may include at least one inclined lateral wall on an outside of the main body extending between a bottom of the main body and a top of the main body for deflecting sediment as the main body moves within a complex environment. The main body may include a retractable plow configured to move relative to the main body between a lowered position and a raised position.

In some aspects, the retractable plow may be configured to move from the lowered position to the raised position in response to a force above a threshold being applied horizontally to a leading edge of the retractable plow. In some aspects, the couplant injection port may be coupled to an aperture, into the inner chamber, that is configured to direct the couplant to flow from a front side of the inner chamber toward a rear side of the inner chamber opposed to the front side. In some aspects, the fluid evacuation port may be disposed on the rear side of the inner chamber. In some aspects, the inner chamber may be open on the rear side such that the opening on the rear side forms the fluid evacuation port. In some aspects, the ultrasound scanner may be disposed facing into the inner chamber closer to the rear side of the inner chamber than the front side of the inner chamber. In some aspects, a vertical height of the inner chamber may narrow from a front of the inner chamber toward a back of the inner chamber. In some aspects, a lateral width of the inner chamber may expand from a front of the inner chamber toward a back of the inner chamber. In some aspects, the main body may further comprise an external nozzle configured to eject fluid forward of the main body. In some aspects, the main body may further comprise an electromagnet configured to produce a magnetic field for biasing the main body toward a ferrous material being scanned by the ultrasound scanner. In some aspects, the main body may further comprise an external nozzle configured to eject fluid in a direction away from the surface being scanned by the ultrasound scanner for biasing the main body toward a material being scanned. In some aspects, the main body may further comprise an inductive sensor configured to detect a distance of the main body relative to a surface being scanned by the ultrasound scanner.

In some aspects, the ultrasound scanner interface may include the ultrasound scanner secured to the main body.

Some aspects include a method of performing a UT scan in a complex environment, which may include positioning a UT scanner interface that holds a UT scanner over a surface of a target material for inspection. The target material may be submerged in a complex environment composed of a primary fluid and contaminants. The ultrasound scanner may be held in a main body of the ultrasound sensor interface such that the ultrasound scanner faces into an inner chamber of the main body and toward an opening on a bottom side of the inner chamber. The method may also include injecting a couplant into the inner chamber and generating an engagement force that biases the ultrasound scanner interface toward the surface of the target material for inspection. The method may also include activating the ultrasound scanner to perform the ultrasound scan of the target material through the couplant in the inner chamber.

In some aspects the method may include moving the ultrasound scanner interface within the complex environment, which causes a pair of rollers mounted to the main body to roll in a direction of the movement, wherein the rollers flank two lateral sides of the inner chamber and bound opposed sides of the filtered region underneath the ultrasound scanner interface. Also, the method may include moving the ultrasound scanner interface within the complex environment to a target area of the target material for scanning. Couplant integrity may be maintained in the filtered region underneath the ultrasound scanner interface in part by a pair of flexible skirts extending from lower edges of the inner chamber. A pressure differential between the couplant being injected into and fluid being suctioned from the inner chamber may form a net negative pressure within the inner chamber that pulls the ultrasound scanner interface toward the target material. The method may include generating the engagement force by suctioning fluid from the inner chamber to form a filtered region below the ultrasound scanner interface. The fluid suctioned from the inner chamber may include at least one of couplant and contaminants for filtering out contaminants from the filtered region. The method may include generating the engagement force by powering an electromagnet configured to draw the ultrasound scanner interface toward the surface of the target material for inspection. The method may include generating the engagement force by ejecting fluid from the ultrasound scanner interface in a direction away from the surface of the target material for inspection.

In some aspects, the method may also include coupling the ultrasound scanner interface to a remote source of the primary fluid. Also, the primary fluid may be conveyed to the ultrasound scanner interface while pumping the primary fluid into the inner chamber.

In some aspects, the method may also include measuring movement of a retractable plow relative to the main body to identify an obstacle that has contacted the retractable plow.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

FIGS. 8A-8E are process flow diagrams illustrating methods of using a UT scanner in a complex environment in accordance with various embodiments.

DETAILED DESCRIPTION

Figure 1A:
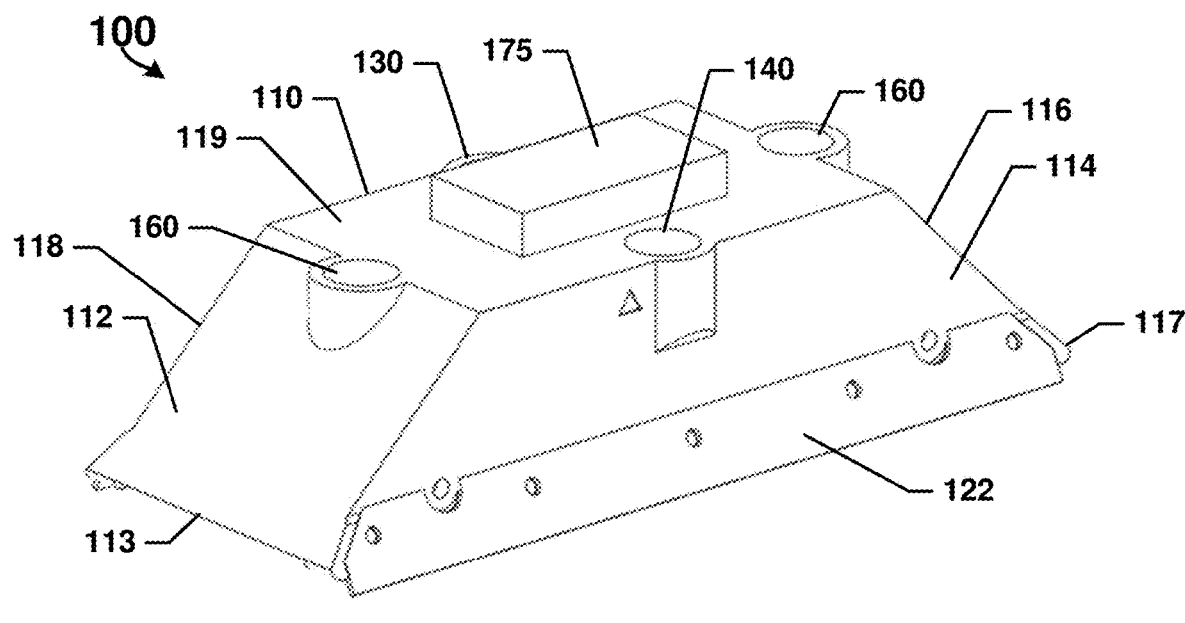
FIG. 1A is a top perspective view of a UT scanner interface for complex environments in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Using UT sensors in complex environments is challenging, particularly performing UT testing of oil storage tanks after years of service. As used herein, the term "complex environments" refers to the surroundings or conditions in which a UT sensor is placed and in which one or more primary fluids are mixed with other elements or particulates, particularly in an uneven or inconsistent way. While there is a need to inspect the thickness and integrity of crude oil holding tanks to ensure they are not compromised, the bottom of an in-service crude oil holding tank includes sludge and sediment that will impair UT sensor measurements. The combination of crude oil mixed with sludge, sediment and/or other particulates forms a complex environment. Sludge is known for having sediment, such as sand and ferrous metal particulates, which may reflect, distort, or block the UT signals (i.e., wave forms), thus making UT based NDT impossible. Without being able to accurately predict the velocity of UT signals through the couplant due to sludge and sediment contamination, measurements of crude oil holding tank bottoms may not be accurately taken. In addition to crude oil holding tanks, complex environments applicable to various embodiments may include holding tanks of other similarly viscous materials, such as for fuel, or even water, fluid chemical holding tanks, or combinations of any of these.

As used herein, terms such as "bottom," "top," "front," "back," and/or similar directional references are used for reference purposes and should not be strictly confined to a specific orientation. While "bottom," "top," "front," "back," conventionally denote the lower most, upper most, forward most, and rearward most part or surface of a structure, respectively, the interpretation of directional terms can vary depending on the orientation of that structure in a particular application. These terms are employed herein as relative descriptors, serving as a point of reference rather than imposing a fixed orientation.

As used herein, "couplant" refers to a material (usually liquid) that facilitates the transmission of ultrasonic energy from the transducer into a target material being scanned. The couplant may be composed of water, oil, specialty gels, or a combination thereof.

Various embodiments include a UT scanner interface configured to maintain couplant integrity between the UT scanner and a target material being scanned in a complex environment. The target material being scanned, in various embodiments, may be the material forming the floor of a crude oil or other primary fluid holding tank. Maintaining couplant integrity provides a known and/or predictable signal transmission velocity through the couplant during UT scanning.

Various embodiments included a UT scanner interface device configured to maintain couplant integrity for a UT scanner by removing foreign elements, such as sediment, sludge, and/or biofouling, that can reflect waves and distort scanning by the UT scanner from a zone of UT inspection. The UT scanner interface may include a main body with an inner chamber for holding couplant supplied from one or more inlet ports. The inner chamber may be open on one side that is configured to face a surface being scanned. Since sediment may be prone to entering the inner chamber through the opening on the one side, the inner chamber may also include one or more outlet ports. In this way, while couplant is being supplied from the one or more inlet ports, fluid that may contain a mixture of couplant and sediment is being removed via the one or more outlet ports. By steadily supplying couplant and evacuating the fluid mixture from the inner chamber, the UT scanner interface may remove particles and other elements that might otherwise interfere with the UT scanning, leaving a material of known properties that are suitable for scanning and providing reliable and consistent ultrasonic transducer readings. In particular, by flowing couplant across a portion of the inner chamber, a filtered region may be created between the UT scanner and the surface being scanned (e.g., below the UT scanner). The fluid suctioned from the inner chamber may include couplant and/or contaminants, which may help filter out contaminants from the filtered region.

Various embodiments may include means for generating an engagement force that biases the UT scanner interface toward the surface of the target material for inspection. In some embodiments, the means for generating the engagement force may include one or more outlet ports used to suction fluid from the inner chamber. The fluid suctioned or otherwise drawn out of the inner chamber may create a pressure differential compared to couplant injected into the inner chamber. The pressure differential between the inlets and the outlets may form a net negative pressure within the inner chamber that pulls the UT scanner interface toward the target material being scanned. In some embodiments, the means for generating the engagement force may include one or more external nozzles configured to eject fluid in a direction away from the UT scanner (e.g., upwardly) for biasing the main body toward the material being scanned. In some embodiments, the means for generating the engagement force may include an electromagnet configured to produce a magnetic field for biasing the main body toward a ferrous material being scanned by the UT scanner.

In various embodiments, the UT scanner interface may include a skirt on one or more edges of the opening to the inner chamber, to prevent or limit couplant from leaking out and/or sediment from seeping in while scanning.

In various embodiments, the UT scanner interface works with a UT scanner that includes an ultrasonic transducer (also known as an ultrasonic sensor), which is a device that emits ultrasonic energy into a couplant and receives ultrasonic energy reflected by a surface under inspection, including reflections from defects or other irregularities within the surface. As used herein, the terms "ultrasonic nondestructive testing" or just "UT" refer to a method of characterizing the thickness or internal structure of a test piece through the use of high frequency sound waves. The UT scanner interface may work with phased array ultrasonic testing (PAUT), also known as a phased array ultrasonic transducer. A PAUT is a non-destructive inspection technique that uses several ultrasonic transducers within a single probe to achieve higher resolution scans. Thus, various embodiments include several UT sensors within the UT scanner interface. Each of the testing probes may emit pulses of ultrasound individually with computer-calculated timing to create a phase-directed ultrasound beam, and computer-processing of reflected ultrasound detected by each testing probe then able to generate an image of structures underlying the surface under examination. The array of multiple ultrasonic transducer elements forms a PAUT scanner.

The UT scanner interface according to various embodiments is suitable for enabling UT inspections in complex environments including viscous mixtures with accumulated sediment or sludge from a primary fluid. Such viscous mixtures are generally composed of liquid and solid components or a semi-solid slurry but have a much higher proportion of solid components and/or a higher viscosity than the primary fluid from which it originated. Solid components may originate as matter that was previously suspended in the primary fluid but settled to the bottom over time, as part of a refining process, and/or bits of metal (e.g., rust or delamination) from the tank in which the primary fluid is held. As used herein, the terms "primary fluid" and "viscous mixture" are related in that the viscous mixture is a product of the primary fluid and/or originated from fluid that is the same as the fluid from which the viscous mixture originated. In various embodiments, the primary fluid may be drawn from above the viscous mixture (e.g., a higher level within a tank holding both the primary fluid and the viscous mixture) and pumped into (i.e., under pressure) the UT scanner interface as a couplant or fed into (i.e., non-pressurized) the UT scanner interface as a lubricant.

A UT scanner interface, in accordance with various embodiments, may be used for inspections of fluid storage tanks holding viscous mixtures, such as the inspection of a bottom of the fluid storage tank without draining the contents. Over time sludge, sediment, and/or other particulate materials build up at the bottom of fluid storage tanks, which generally prevents the tank from being inspected without removing the viscous mixture. A UT scanner interface in accordance with various embodiments may be placed in a tank holding a viscous mixture and enable inspection of the tank. Once the UT scanner interface reaches the floor of the tank (e.g., at the bottom), the UT scanner interface may be configured to introduce and maintain a volume of couplant between the scanner and the surface being scanned for determining the thickness of the material forming the bottom of the tank. The UT scanner interface of various embodiments may negate the need to take the tank out of service and empty and/or clean the tank for inspection. Additionally, the UT scanner interface of various embodiments may also be used for inspection of other liquid holding or carrying vessels, such as pipelines, which may have similar issues with deterioration or compromise of the walls holding in the liquid. Thus, the UT scanner interface of various embodiments may be used to apply UT scanning in complex environments.

Various embodiments may include a UT scanner interface that is configured to hold a UT scanner within a chamber, facing a surface being scanned through an open side of the chamber (e.g., the bottom side). A couplant capable of carrying ultrasonic waves may be injected into the chamber to provide a reliable medium between the UT scanner and the surface being scanned. Some embodiments use a combination of pressure and vacuum forces to keep the couplant chamber closed off by the surface being scanned. Maintaining pressure differentials between fluids injected into the chamber and fluids released there from may form a partial vacuum in the chamber, which may cause the UT scanner interface to be pulled toward the surface being scanned with clear couplant filling the chamber to make measurements therein more reliable.

Figure 1B:
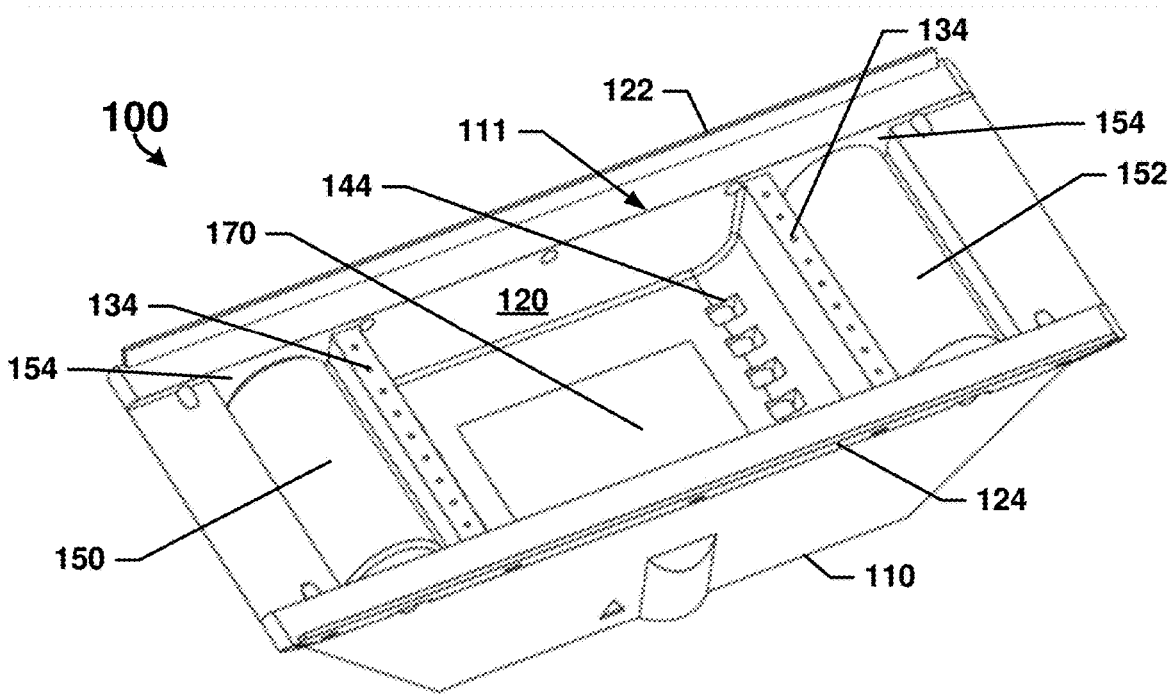
FIG. 1B is bottom perspective view of the UT scanner interface of FIG. 1A in accordance with various embodiments.
Figure 1C:
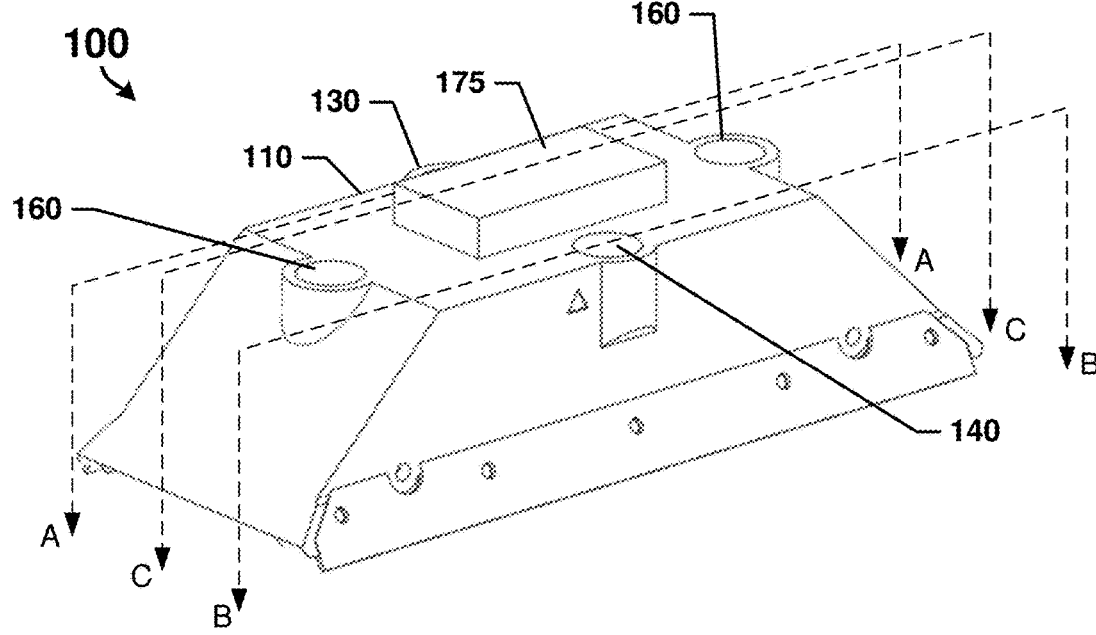
FIG. 1C is a top perspective view of the UT scanner interface of FIGS. 1A and 1B with several section lines noted thereon.

FIGS. 1A-1C illustrate A UT scanner interface 100 for complex environments in accordance with various embodiments. The UT scanner interface 100 includes a main body 110 that includes an inner chamber 120 open on a bottom side 111 (e.g., the bottom side in the orientation shown in FIG. 1A). The main body 110 is configured to hold A UT scanner 170 facing into the inner chamber 120 and toward the opening (see, opening 121 in FIGS. 2A-2C) on the bottom side 111. The main body 110 may also include a couplant injection port 130, which may be configured to inject a couplant into the inner chamber 120. The inner chamber 120 may be configured to be filled or at least substantially filled by the couplant injected therein. Additionally, the main body 110 may include a fluid evacuation port 140 configured to remove fluid from the inner chamber. The fluid removed from the inner chamber includes at least some of the couplant injected into the inner chamber.

In accordance with various embodiments, the UT scanner interface 100 includes means for generating an engagement force that biases the UT scanner interface toward the surface being scanned using a negative pressure differential between one or more low pressure inlet ports injecting coupling and one or more higher pressure outlet ports drawing out a fluid mixture, which may include couplant, sediment, etc., from the inner chamber.

As the UT scanner interface 100 is lowered onto a target surface (e.g., the bottom of an oil tank), the inner chamber 120 will fill with fluid that was located where the UT scanner interface 100 landed. The couplant from the couplant injection port 130 may be supplied under relatively low pressure into the inner chamber 120, which will enter the inner chamber 120 and mix with the fluid already present within the inner chamber 120. In addition to pumping couplant into the inner chamber 120, the fluid mixture present in the inner chamber 120 may also be suctioned out via the fluid evacuation port 140. Drawing fluid out of the inner chamber 120 and replacing it with fresh couplant will quickly lead to the inner chamber 120 being predominantly filled with couplant, flushing out contaminants like sediment, sludge, and/or biofouling from the inner chamber. By continuing to draw fluid out of the inner chamber 120 and replacing it with fresh couplant, after some time the fluid within the inner chamber 120 will consist primarily of couplant. In this way, couplant integrity between the UT scanner 170 and the target surface is maintained.

In various embodiments, the couplant injection port 130 may receive couplant from a supply line coupled to the couplant injection port 130. The couplant may be the primary fluid held in the tank being inspected, such as oil. Alternatively, the couplant may be a different oil-based liquid, water, specialty gels, or a combination thereof (i.e., with or without oil). The primary fluid may be drawn through the supply line from a higher region in the tank or other area less likely to have primary fluid contaminated by sediment, sludge, or biofouling. Alternatively, the primary fluid may be supplied from a separate holding vessel inside or outside the tank being inspected. Although one couplant injection port 130 is illustrated, more than one couplant injection port 130 may be included in the main body 110.

The couplant injection port 130 may be coupled to a series of inlet ports 134 disposed along an outer edge of the opening 121 on the bottom side 111 of the main body 110. The series of inlet ports 134 may be configured to distribute couplant supplied from the couplant injection port 130 into the inner chamber 120. In various embodiments, the series of inlet ports 134 may be disposed outside the inner chamber 120. For example, the series of inlet ports 134 may be disposed just outside the inner chamber, such as along an outer edge thereof. In addition, the series of inlet ports 134 may be disposed opposing edges of the inner chamber. In this way, the series of inlet ports 134 may face in the same direction as the UT scanner 170 (e.g., toward the target surface being scanned). Additionally, or alternatively, one or more of the series of inlet ports 134 may face or include a nozzle directing couplant toward the UT scanner 170 to ensure critical surfaces are kept clean and/or clear.

The fluid evacuation port 140 may be coupled to a series of outlet ports 144 disposed adjacent to the inner chamber 120 and configured to receive couplant supplied to the inner chamber 120. In some embodiments, the series of outlet ports 144 may be distributed along opposing sides of the UT scanner 170 within the inner chamber. By locating the series of inlet ports 134 that eject couplant near the bottom of the inner chamber 120 and the series of outlet ports 144 that vacuum fluid in an upper part of the inner chamber 120, a circulating fluid flow will develop there between that may help move contaminants toward the series of outlet ports 144 and out of the inner chamber 120.

In various embodiments, the main body 110 may be formed as a housing with four walls extending downward (in the orientation shown in FIG. 1A) from a top wall 119 that is horizontal and configured to extend parallel to the surface being scanned. A front wall 114 and a back wall 118 located opposite one another may extend perpendicular or nearly perpendicular from the top wall 119. Alternatively, the front and back walls 114, 118 may be formed to have an incline and thus be configured to deflect sediment as the main body 110 moves within the complex environment. A lower edge of the front wall 114 and/or the back wall 118 may include a flexible skirt 122, 124 configured shield or deflect fluid or sediment from entering the inner chamber 120. The flexible skirt 122, 124 may be a thin, flexible materials, such as $\frac{1}{8}^{th}$ inch silicon material. Alternatively, the flexible skirt 122, 124 may be formed like an inflatable hovercraft skirt, with oil pressure from the inner chamber 120 creating a fluid cushion within a flexible skirt that slightly lifts the main body 110 while the curtain (i.e., the skirt) functions to block out contaminants. As a further alternative, the flexible skirt 122, 124 may be formed as or include brush hairs/fingers or the like.

In contrast to the front and back walls 114, 118, a first lateral wall 112 and a second lateral wall 116 may also extend from the top wall 119 but at an incline. The first and second lateral walls 112, 116 may be configured to deflect sediment as the main body 110 moves laterally within the complex environment. Also, the inclined nature of the first and second lateral walls 112, 116 may deflect sludge in a manner that presses the main body 110 down toward the target surface, providing a force to help keep the UT scanner interface 100 in contact with the target surface to be scanned. Lowest edges 113, 117 of the first and second lateral walls 112, 116 may be slightly higher than a lowest portion of the flexible skirts 122, 124. Optionally, or alternatively the lowest edges 113, 117 may include a flexible skirt or a more flexible barrier, such as one formed by brush hairs or the like.

The main body 110 may also include a sensor housing 175 configured to hold the UT scanner 170. In some embodiments, the sensor housing 175 may be a removeable casing that is part of the UT scanner 170 and configured to be removed therewith, such as for maintenance or replacement. A power and/or data cable may be coupled to the sensor housing 175 for providing power operating the UT scanner and conveying measurement data from the UT scanner 170 to remote recording and imaging equipment (not shown).

In various embodiments, the UT scanner interface 100 may include a pair of rollers 150, 152 configured to help move the UT scanner interface 100 within the complex environment while maintaining a contact with the target surface to minimize entrance of sludge into the inner chamber as the interface moves. In addition, rollers 150, 152 may assist the UT scanner interface 100 in traversing uneven surfaces. The pair of rollers 150, 152 may be disposed on opposed sides of opening 121 and configured to engage the target surface during scanning by the sensor. Each of the rollers 150, 152 may be located at least partially inside a roller cavity 154 configured to house one of the rollers 150, 152. Like the rollers 150, 152, the roller cavities 154 may be disposed on opposite sides of the inner chamber 120. The rollers 150, 152 may be free-spinning cylinders held in the roller cavity 154 by a central axis rod or trapped in the roller cavity 154 by an added labrum member along the lower edges of the larger opening to the roller cavity 154. Alternatively, the rollers 150, 152 may be driven by a motor or hydraulics. The rollers 150, 152 may be rubber or at least have an outer rubber coating for better traction. Alternative materials may be used that may improve traction and/or minimize damage to the surfaces being scanned. As a further alternative or addition, the rollers 150, 152 may have outer surface treatments, such as knobs, treads, grooves, or the like to improve traction. Alternatively, one or all of the rollers 150, 152 may be replaced with skids.

In some embodiments, the main body 110 may include one or more fluid supply ports 160 configured to supply the pair of roller cavities 154 with fluid for lubricating the pair of rollers 150, 152. The roller cavities 154 may tend to attract sand, sediment, or other particulates that could gumup and stop the rollers 150, 152 from rolling. Thus, the fluid supply ports 160 may communicate a lubricant, such as clean oil, to the pair of roller cavities 154. However, unlike the couplant injection port 130, the fluid supply ports 160 need not be pressurized, thus allowing the lubricant to free-flow into the roller cavities 154. Some of the negative pressure differential maintained in the inner chamber may also work to draw fluid into the roller cavities 154.

In some embodiments, the pressure differential between the couplant supplied from the couplant injection port 130 (i.e., positive pressure into the inner chamber 120) and the fluid suctioned out of the inner chamber 120 (i.e., negative pressure out of the inner chamber 120) to the fluid evacuation port 140 may be maintained to create a suction force that draws the UT scanner interface 100 onto the target surface. That suction force may be enough to hold the main body 110 in-place while scanning but should be weak enough to allow the UT scanner interface to be moved to another section of the target material. In particular, the rollers 150, 152 should still be able to roll, allowing the main body 110 to move. The draw-down suction force may also tend to pull sediment into the inner chamber 120 from the front and back sides (i.e., the edges of the opening extending between the two rollers 150, 152), which is prevented or at least limited by the flexible skirts 122, 124 and the rollers 150, 152. Some embodiments may also take advantage of gravity, which may pull the UT scanner interface 100 toward the bottom of the tank based on its weight, in combination with negative pressure maintained within the main body (e.g., 110).

Various embodiments include one or more ports (e.g., couplant injection port 130, fluid evacuation port 140, series of inlet ports 134, series of outlet ports 144, fluid supply ports 160, etc.). As used herein, the term "port" refers to an opening or connection point in a device or system that allows the flow of fluid. Thus, a port may refer to an inlet or outlet through which a fluid enters or exits a component. In various embodiments, one or more of the ports described herein may include a nozzle. As used herein, the term "nozzle" refers to a specific type of port that is designed to accelerate, decelerate, direct, and/or configure the flow of fluid or gas. A nozzle is a device or opening with a carefully shaped geometry that may change the velocity and pressure of a fluid passing through it. The shape and design of a nozzle may be configured to define desired flow characteristics and performance of the fluid passing through it.

Figure 2A:
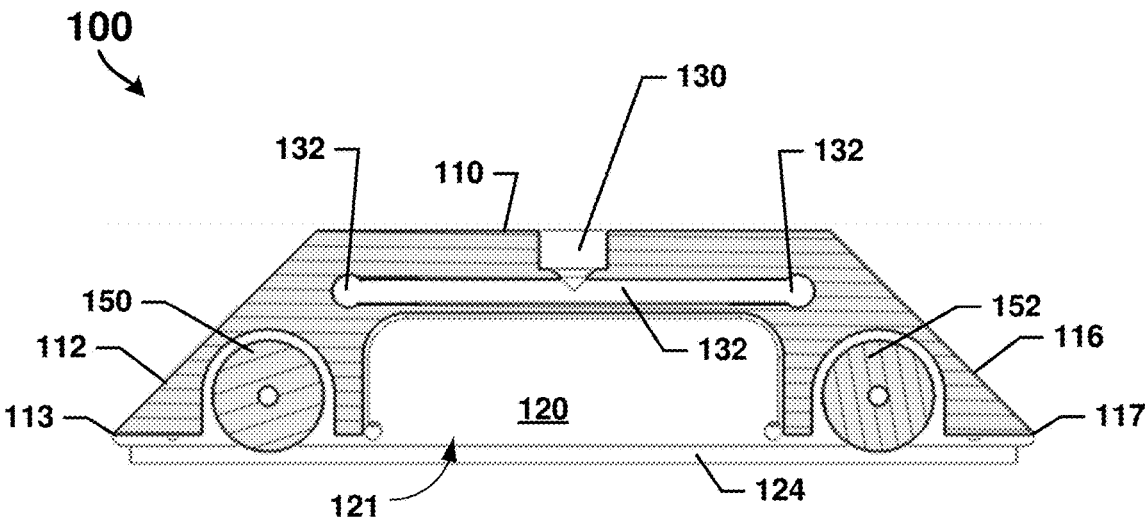
FIG. 2A is a side elevation section view of the UT scanner interface of FIG. 1C at section A-A, in accordance with various embodiments.
Figure 2B:
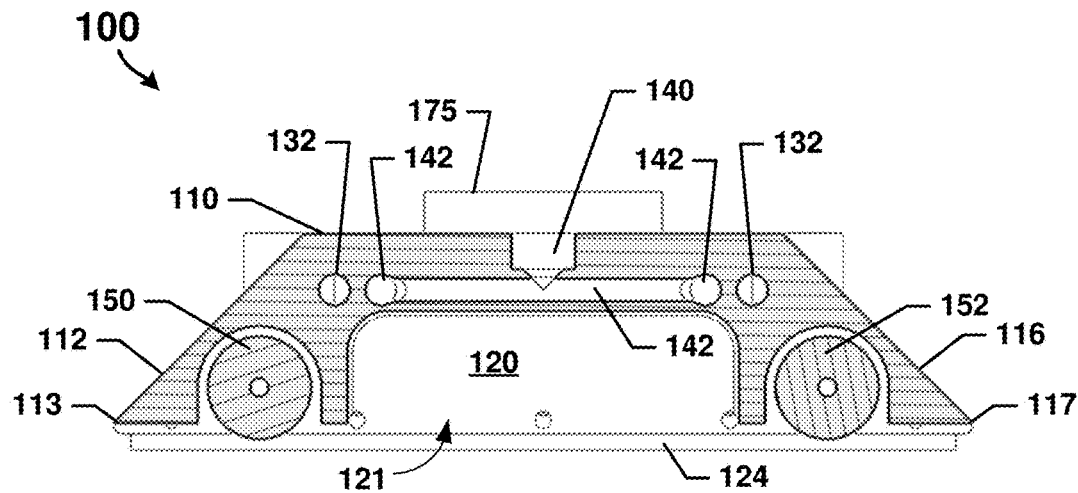
FIG. 2B is a side elevation section view of the UT scanner interface of FIG. 1C at section B-B, in accordance with various embodiments.
Figure 2C:
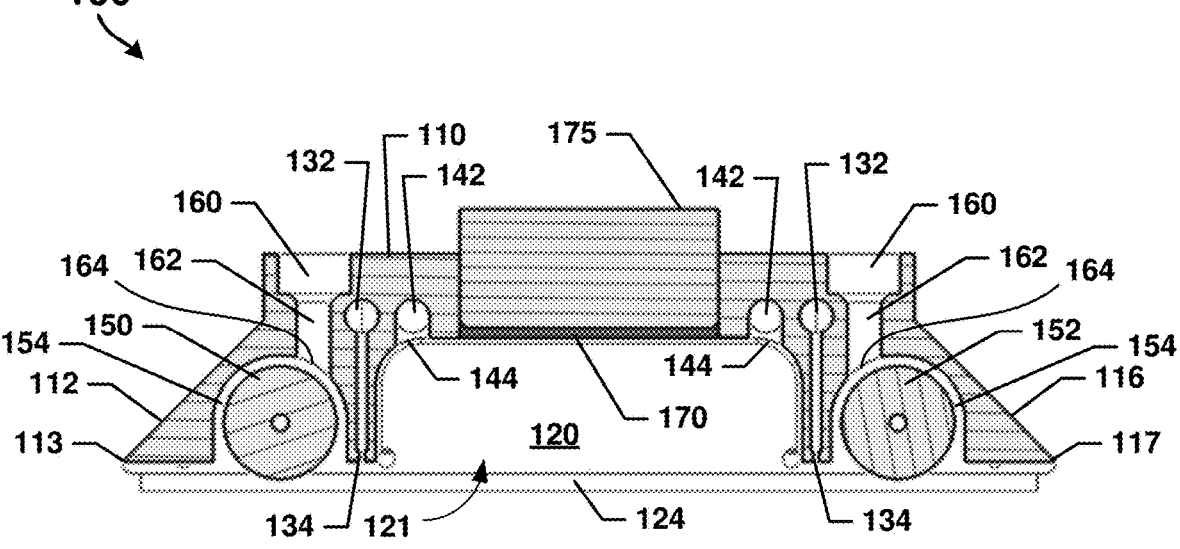
FIG. 2C is a side elevation section view of the UT scanner interface of FIG. 1C at section C-C, in accordance with various embodiments.

FIGS. 2A-2C illustrate side elevation section views of the UT scanner interface 100 at section lines noted in FIG. 1C. The first section A-A dissects the UT scanner interface 100 laterally through the couplant injection port 130. The second section B-B dissects the UT scanner interface 100 laterally through the fluid evacuation port 140. The third section C-C dissects the UT scanner interface 100 laterally through the fluid supply ports 160 and a center of the sensor housing 175.

FIG. 2A shows how the couplant injection port 130 may be coupled to a couplant injection passage 132 inside the main body 110 that may lead to the series of inlet ports (e.g., 134 in FIG. 2C), in accordance with various embodiments. The couplant injection passage 132 may branch laterally in order to supply couplant from opposed lateral sides just outside the inner chamber 120.

FIG. 2B shows how the fluid evacuation port 140 may be coupled to a fluid evacuation passage 142 inside the main body 110 that may lead to the series of outlet ports (e.g., 144 in FIG. 2C), in accordance with various embodiments. The fluid evacuation passage 142 may branch laterally in order to draw fluid from opposed lateral sides of the top of the inner chamber 120.

FIG. 2C shows how the couplant from the couplant injection passage 132 is delivered to the series of inlet ports 134, in accordance with various embodiments. In addition, the fluid evacuation passage 142 is shown providing an egress for fluid from the series of outlet ports 144. In addition, the fluid supply ports 160 are shown coupled to fluid supply passages 162 inside the main body 110 that each lead to separate fluid supply ports 164 opening into respective ones of the roller cavities 154.

In various embodiments, the UT scanner 170 may be set in a top wall of the inner chamber 120 so that the UT scanner 170 faces the opening 121 in a bottom side of the inner chamber 120.

Figure 3:
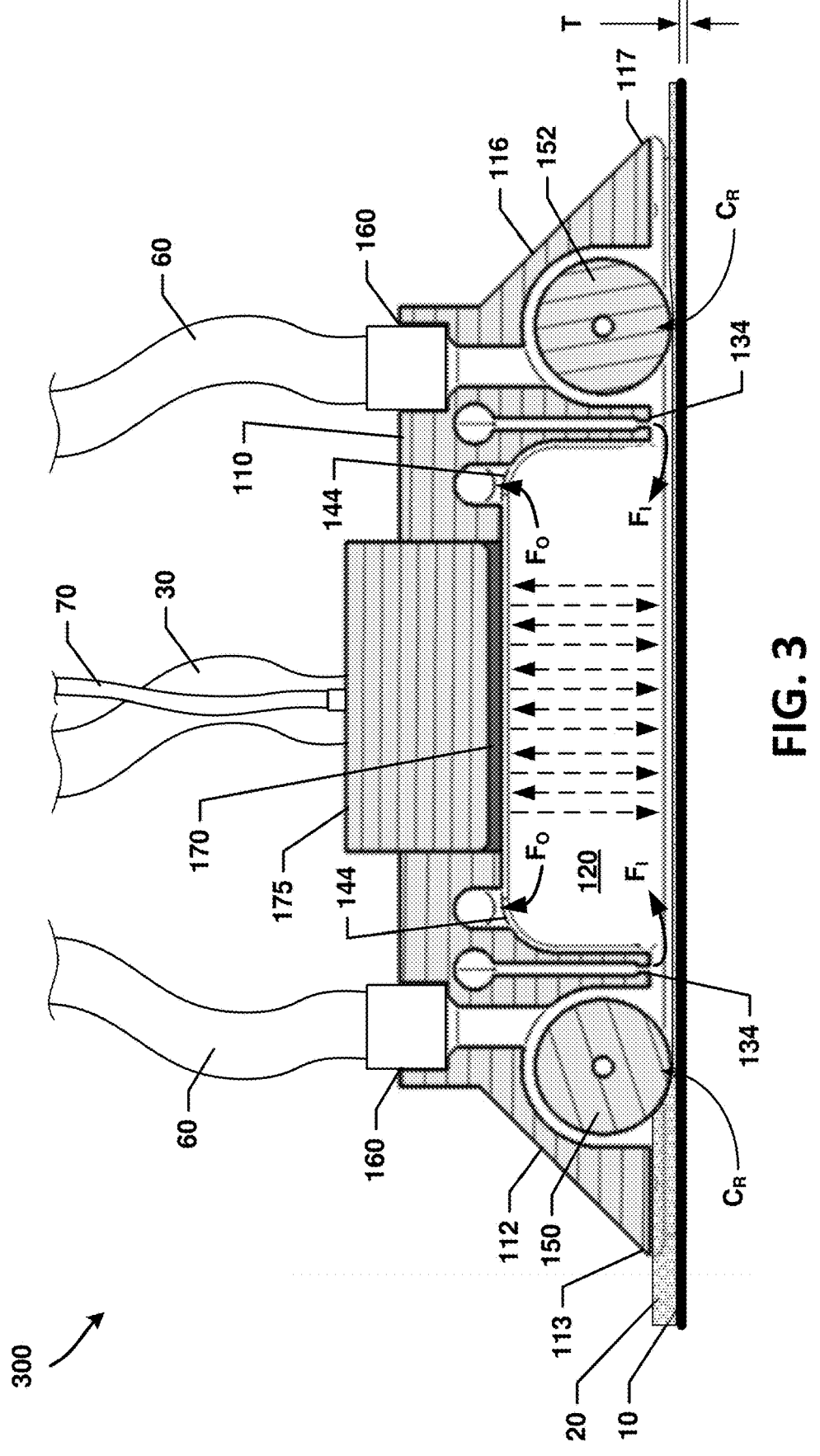
FIG. 3 is a side elevation section view of the UT scanner interface in a working environment, in accordance with various embodiments.

FIG. 3 shows the UT scanner interface 100 in a working environment 300 in accordance with various embodiments. The working environment 300 may represent the complex environment at the bottom of a crude oil tank. As shown, a portion of a target material 10 (e.g., the bottom metal wall of the tank) is being scanned by the UT scanner 170. Such a scan may be useful for determining a thickness T of the target material 10 As is common with complex environments, the target material 10 may be covered in a sediment layer 20. Once the UT scanner interface 100 is set down over the target material 10, the UT scanner interface 100 may sink into the sediment layer 20. Thereafter, couplant may be injected by an inflow $F_I$ into the inner chamber 120 from the inlet ports 134 flanking the outer open edges of the inner chamber 120. In addition, fluid may be drawn out of the inner chamber 120 causing an outflow $F_O$ therefrom. Removing potentially contaminated fluid (i.e., couplant mixed with sediment, sludge, and/or biofouling) from the inner chamber 120 and replacing it with non-contaminated couplant will help maintain couplant integrity within the inner chamber 120 and make sensor readings by the UT scanner 170 more reliable. After some time of evacuating contaminated fluid from the inner chamber 120, a thickness of the sediment layer 20 directly below the opening 121 of the inner chamber 120 may be nominal or the sediment layer 20 may be eliminated in that area.

In some embodiments, the rollers 150, 152 may project from a bottom of the UT scanner interface 100, thus maintaining a gap between a bottom of the main body 110 and a contact point $C_R$ of the rollers 150, 152 with the target material 10. In addition, since the rollers 150, 152 are cylindrical, the contact points $C_R$ may extend along the length of the rollers 150, 152, each of which extend from a front to a back of the main body 110. In this way, the contact points $C_R$ extending across the length of each roller 150, 152 form lateral boundaries to a filtered region below the UT scanner interface 100 that is configured to be evacuated of contaminated fluid. That filtered region below the UT scanner interface 100 may also be bounded on the front and back sides by the flexible skirts 122, 124. An aspect of various embodiments that generates and maintains the filtered region is that the series of inlet ports 134 are located laterally between the rollers 150, 152 and are vertically higher than the contact points $C_R$. The vertical offset between the series of inlet ports 134 and the contact points $C_R$ allows the inflow $F_I$ to circulate contaminated fluid into the inner chamber 120 and particularly toward the series of outlet ports 144.

In accordance with various embodiments, the couplant injection port (e.g., 130) may be coupled to a couplant supply line 30. Similarly, the fluid supply ports 160 may be coupled to fluid supply lines 60. Likewise, the UT scanner

170 may have a power/data line 70 coupled to the sensor housing 175 for providing power and communicating data therefrom. In addition, the fluid evacuation port (e.g., 140) may be coupled to a fluid evacuation line. Unlike the couplant supply line 30 and the fluid supply line 60, the fluid evacuation line need not extend to a remote region. For example, fluid evacuation line may direct evacuated fluid to a nearby area already scanned by the UT scanner interface. Alternatively, an upper region of the main body 110 may include a manifold that couples one or more fluid, power, and/or data lines to the couplant injection port, the fluid evacuation port, the fluid supply ports 160, and/or the sensor housing 175.

Figure 4A:
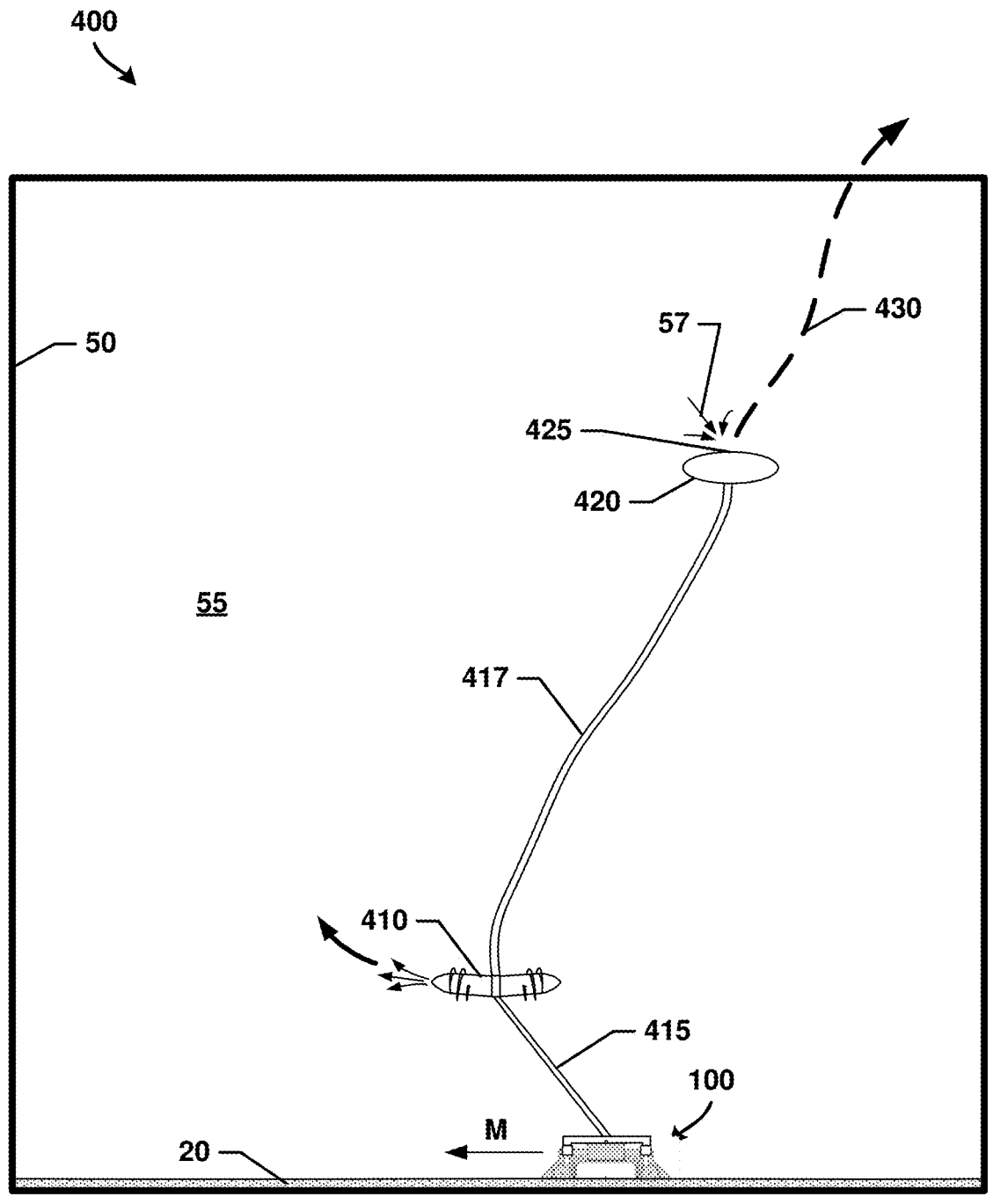
FIG. 4A is a schematic view of a UT scanner interface in a working environment in accordance with various embodiments.

FIG. 4A shows a robot 410 maneuvering in a working environment 400 to move the UT scanner interface 100 in accordance with various embodiments. The UT scanner interface 100 may be relatively smaller than that illustrated in FIG. 4A, particularly relative to the robot 410. In FIG. 4A, the robot 410 is shown submerged in a tank 50 (i.e., a holding vessel), which contains a primary fluid 55 and a sediment layer 20 in the form of thick sediment at the bottom of the tank 50. The robot 410 is shown submerged within the primary fluid 55 and pulling the UT scanner interface 100 along a bottom of the tank 50. Alternatively, lower layers of the primary fluid 55 may contain more contaminants and form a more viscous mixture, but the robot 410 is configured to operate in that environment as well.

In various embodiments, the UT scanner interface 100 may be coupled to the robot 410, which is configured to maneuver through the primary fluid 55. In addition, the robot 410 may be configured to move the UT scanner interface 100 through sludge, sediment, and/or biofouling, such as the sediment in an oil tank. The robot 410 may include a propulsion system, which may be used to push, pull, or otherwise move the UT scanner interface 100 through complex environments. The robot 410 may reduce the viscosity of the primary fluid 55 or a viscous mixture thereof in a localized manner without external chemicals and with a low-energy solution by ejecting a primary fluid to locally reduce the viscosity of the mixture around the robot 410 and/or the UT scanner interface 100. Reducing viscosity locally may enable objects like the robot 410 or the UT scanner interface 100 to move through and maneuver in the primary fluid 55 or a viscous mixture thereof, which facilitates inspections in environments such as crude oil tanks and the like without removing any material (i.e., the viscous mixture or the fluid associated with the viscous mixture). Various embodiments enable the UT scanner interface 100 to operate in complex environments for conducting inspections and/or analysis of the tank and/or the sediment. A technical advantage provided by various embodiments is that inspections may be performed of such tanks and/or sediment without having to remove the viscous mixture (e.g., the sediment).

In some embodiments, the UT scanner interface 100 may include a lower fluid line 415, in the form of a collection hose, tether line, or pipe, that extends from the UT scanner interface 100 to the robot 410. The lower fluid line 415 may be a rigid or semi-rigid pipe that is configured to push and/or pull the UT scanner interface 100. Alternatively, in place of the lower fluid line 415, the UT scanner interface 100 may be coupled to the robot 410 by a rigid or semi-rigid frame or gantry. The frame or gantry could include additional mechanisms for moving the UT scanner interface 100 (e.g., laterally along the gantry), in addition to the forward or backward movement provided by the robot 410. Similarly, the robot could move to position the UT scanner interface 100 over a new area and then the frame or gantry could shift the UT scanner interface 100 laterally or otherwise to cover a wide area near that new area. From the robot 410, an upper fluid line 417 may extend toward upper regions of the tank 50, beyond any viscous mixture and into the primary fluid 55 that is less contaminated or fully uncontaminated.

In some embodiments, the upper fluid line 417 may be connected to a float 420 that will ensure an intake end 425 of the upper fluid line 417, that draws-in uncontaminated primary fluid 57, remains in the uppermost levels of the tank 50. The float 420 may be a buoyancy device or otherwise a tether (e.g., a cable attached to the top of the tank 50) that ensures the intake end remains surrounded by the primary fluid 55 and does not get bogged down a contaminated region of the primary fluid 55. Alternatively, the upper fluid line 417 may be formed from low-density tubing, which may have a natural tendency to float and thus remain in the upper layers of the tank where the primary fluid 55 may be collected.

In some embodiments, the UT scanner interface 100 may include a vacuum pump (i.e., a fluid pump) configured to create the positive and/or negative pressure necessary to inject couplant or remove fluid from the inner chamber (e.g., 120). Alternatively, the vacuum pump may be located in the float 420 or even outside the tank 50. A vacuum pump located outside the tank may require the lower fluid line 415 and/or the upper fluid line 417 to extend from the UT scanner interface 100 to the vacuum pump outside the tank. Additionally, if the primary fluid 55 is drawn from the upper layers of the tank for collection, an additional fluid line may need to extend from that region to the vacuum pump outside the tank.

The UT scanner interface 100 may optionally include a power line 430, which may extend from the main body (e.g., 110) of the UT scanner interface 100 or the sensor housing 175 to a power source outside the tank 50. The power line 430 may run separate and apart from the lower or upper fluid lines 415, 417. Alternatively, the power line 430 may be attached to or incorporated into the lower and/or upper fluid lines 415, 417. Optionally, the power line 430 may pass through the float 420 to power sensors or other components therein, such as a fluid pump. In FIG. 4A, the power line 430 is illustrated as optionally extending outside the tank 50 through the top thereof. Alternatively, the power line 430 and/or one or more of the fluid lines 415, 417 may extend outside the tank through an access hatch or port located on the sides and/or bottom of the tank 50.

Figure 4B:
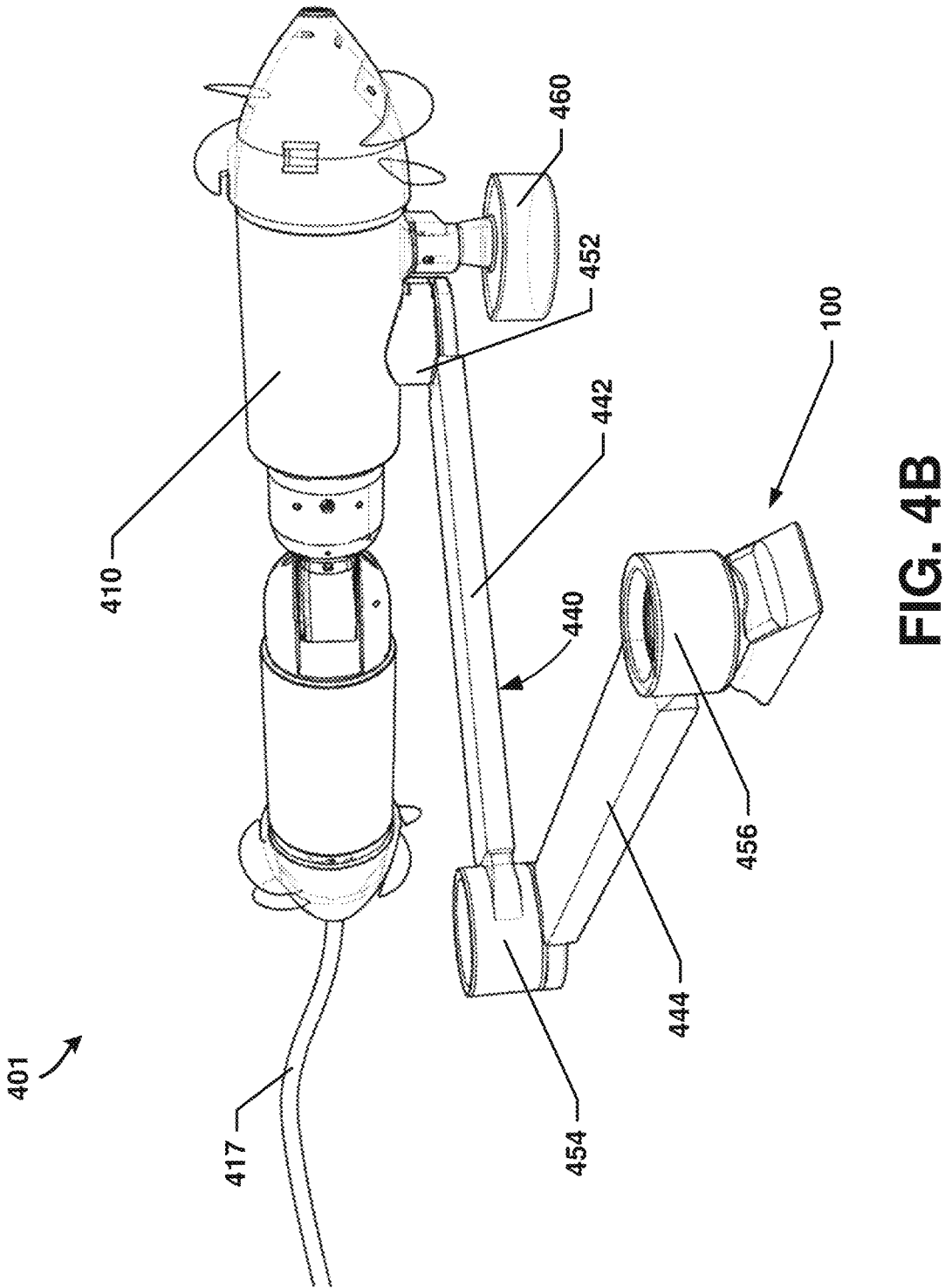
FIG. 4B is a schematic view of a UT scanner interface coupled to a robot through articulating robotic arms in accordance with various embodiments.

FIG. 4B shows a robot 410 with one or more robotic arms 440 maneuvering in a working environment 401 to move the UT scanner interface 100 in accordance with various embodiments. The robotic arms 440 may include one or more articulating joints 452, 454, 456, configured to in conjunction with the arm linkages 442, 444 push or pull the UT scanner interface 100 relative to a position of the robot 410. The robotic arms 440 may provide a selectively articulating but otherwise rigid connection between the UT scanner interface 100 and the robot 410. A first articulating joint 452 may be coupled directly to the robot 410 or a rigid extension thereof as well as coupled to the first arm linkage 442. The second articulating joint 454 may couple the first arm linkage 442 and a second arm linkage 444. Additionally, a third articulating joint 456 may couple the second arm linkage 444 and the UT scanner interface 100. In particular, the third articulating joint 456 may be configured to couple to the main body (e.g., main body 510) at the robot coupling (e.g., robot coupling 505) so that the robot 410 may impart a downward force that maintains the main body in contact with the surface being scanned. The first, second, and third articulating joints 452, 454, 456 may each include a housing with a motor for turning the articulating joints 452, 454, 456 and thus moving the arm linkages 442, 444 and particularly the UT scanner interface 100. In addition, the first, second, and third articulating joints 452, 454, 456 may each include an encoder for measuring angular change, which may be used to determine the precise location of the UT scanner interface 100 relative to the robot 410.

In some embodiments, the robot 410 may additionally include a robotic boot 460, which may house electromagnets for securing the robot 410 to the floor of the tank being scanned. The electromagnets in the robotic boot 460 may selectively generate a magnetic field that interacts with the floor of the tank, which is often made of ferrous materials, resulting in an attractive force that holds the robot 410 firmly in place. In this way, when the electromagnet in the robotic boot 460 is energized the robot 410 via the robotic arms 440 may generate an engagement force that biases the UT scanner interface 100 toward the surface being scanned.

In various embodiments, the UT scanner interface 100 may include additional sensors, such as an inertial measurement unit (IMU) sensor for tracking the orientation of the UT scanner interface 100. The bottom of crude oil tanks may deform and buckle over time, thus detection of areas with such deformations by an IMU sensor may be beneficial. Alternatively, a bubble-type level sensor (e.g., using a mercury float) may be used to detect when the UT scanner interface 100 pitches.

Additionally, debris sensors may be included that can detect if and when the inner chamber is clear of sediment sufficient to begin UT scanning. For example, the debris sensor may use a lateral UT sensor that measures across the inner chamber to detect when signal amplitudes are high enough to indicate the inner chamber is sufficiently free of debris. Alternatively, the debris sensor may use laser (e.g., for inspecting water tanks), sonar, UT, etc. to detect levels of debris in the inner chamber.

Optionally, the main body (e.g., 110) may include one or more protruding fins that may serve as stabilizers.

In some embodiments, the UT scanner interface 100 may include vibrators (i.e., vibration engines), which may assist in loosening up or promoting liquefaction of the viscous mixture around the UT scanner interface 100 to further enable the UT scanner interface 100 to maneuver through the viscous mixture. The vibrators may work in combination with the fluid (e.g., primary fluid) ejected from the series of inlet ports (e.g., 134) to movement of the UT scanner interface 100. The vibrators may be located in or on select portions of the UT scanner interface 100. Alternatively, the vibrators may be surrounding the entire UT scanner interface 100. The vibrator may also be integrated directly into the UT scanner interface 100 or as a floating attachment to operate on the periphery of the UT scanner interface 100.

Vibrations generated by the vibrators may either be linear or rotational. The vibrators may be electric powered, pneumatic, hydraulic, and/or generate vibrations by other means. The amplitude and frequency of the generated vibrations may be designed/adjusted to facilitate a viscosity change in the surrounding viscous mixture. The UT scanner interface 100 should have enough fluid in the region immediately adjacent to it for the vibrations from the vibrators to be able to create a liquefaction event.

Depending on the viscous material through which the UT scanner interface 100 needs to penetrate, one or both of the fluid ejection or vibration techniques may be included and/or employed by the UT scanner interface 100. The heavier, more viscous mixtures (e.g., sand) may require a combination of fluid ejection and vibration for the robot to maneuver there through.

Various embodiments strive to avoid the use of a vacuum pump, which often needs to be relatively large. Including a vacuum pump in the robot 410 may significantly increase the size of the robot 410. Additionally, requiring an additional tether for a fluid mixture vacuumed to a vacuum pump located outside the tank may also be impractical for certain applications. Accordingly, various embodiments endeavored to eliminate the vacuum pump and clear the inner chamber with positive pressure only.

Figures 5A, 5B, 5C, 5D:
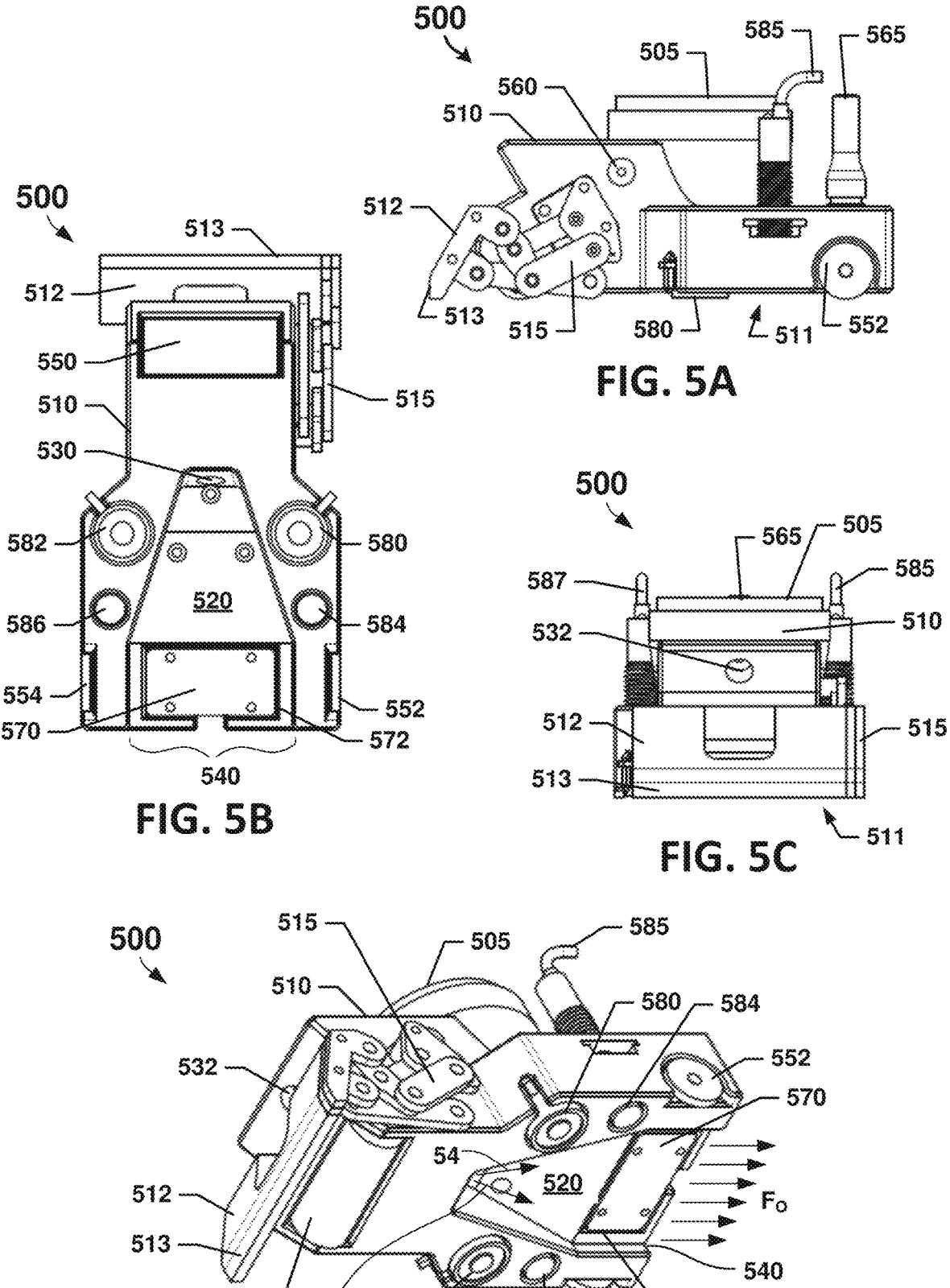
FIGS. 5A-5C are side elevation, bottom, and front views, respectively, of a UT scanner interface in accordance with various embodiments.
FIG. 5D is a bottom perspective view of the UT scanner interface of FIGS. 5A-5C.

FIGS. 5A-5C illustrate A UT scanner interface 500 for complex environments in accordance with various embodiments. The UT scanner interface 500 includes a main body 510 that includes an inner chamber 520, particularly shown in FIGS. 5B and 5D, as well as inner chamber sections 520-A, 520-B in FIG. The inner chamber 520 is open on a bottom side 511 (e.g., the bottom side in the orientation shown in FIGS. 5A and 5C). The main body 510 is configured to hold a UT scanner 570 facing into the inner chamber 520 and toward the opening on the bottom side 511. The main body 510 may also include a couplant injection port 530 (shown in FIGS. 5B and 5E), which may be configured to inject a couplant into the inner chamber 520. The inner chamber 520 may be configured to be filled or at least substantially filled by the couplant injected therein. Additionally, the main body 510 may include a fluid evacuation port 540 configured to remove fluid from the inner chamber. The fluid removed from the inner chamber through the fluid evacuation port 540 may include a mix of couplant injected into the inner chamber 520, as well as other debris or contaminants in the inner chamber 520.

Figure 5E:
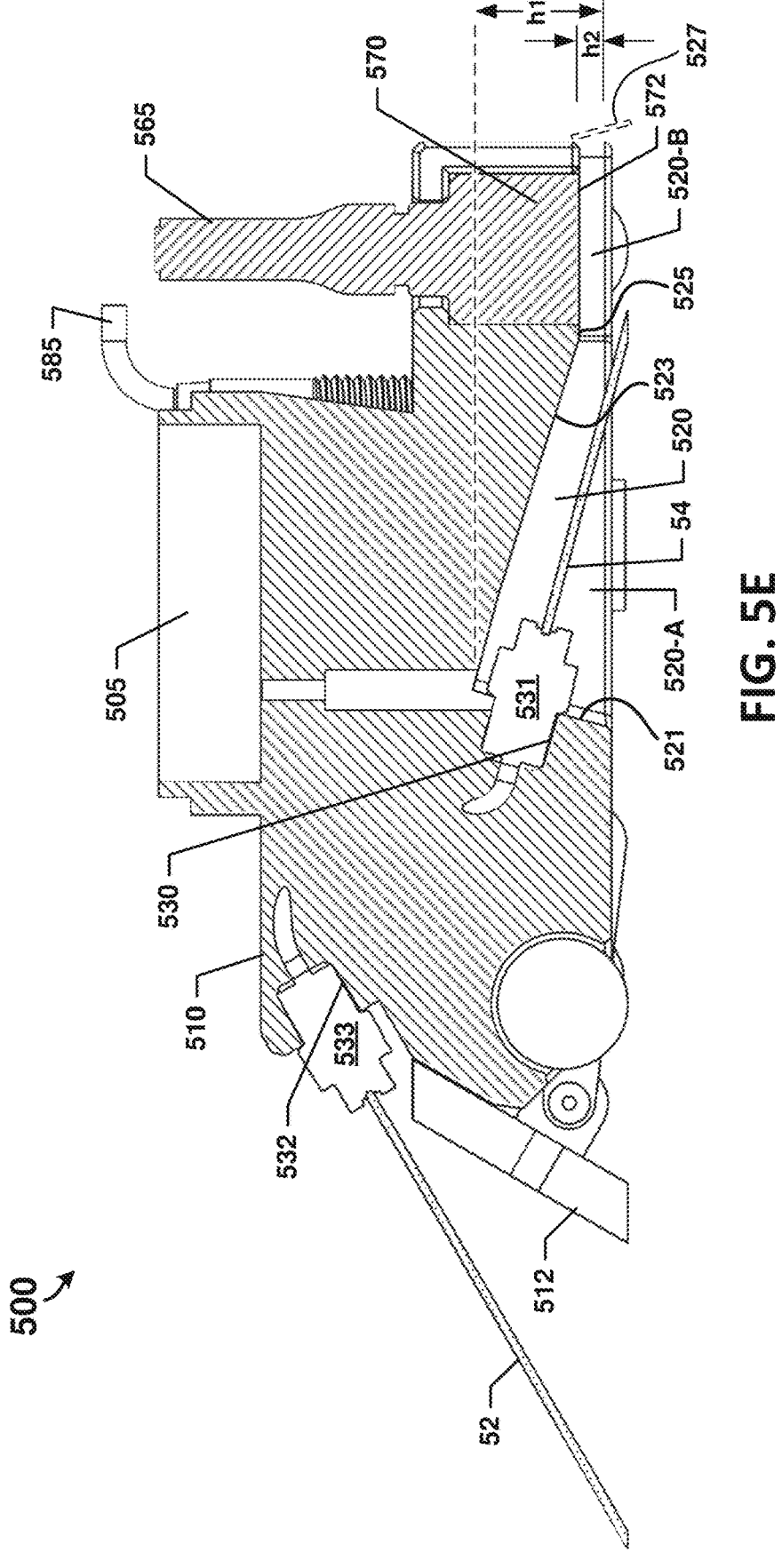
FIG. 5E is a cross-sectional side elevation view of the UT scanner interface of FIGS. 5A-5D.
Figure 5F:
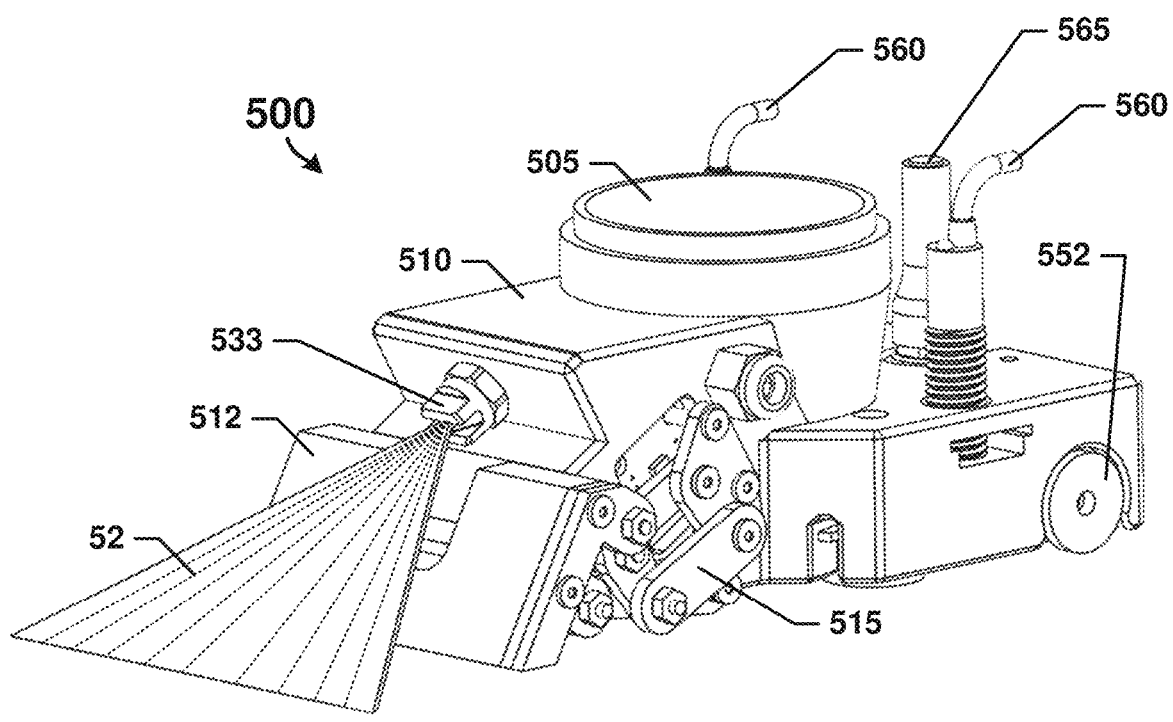
FIGS. 5F-5G are top perspective views of the UT scanner interface of FIGS. 5A-5D with a plow in lowered and raised positions, respectively, in accordance with various embodiments.
Figure 5G:
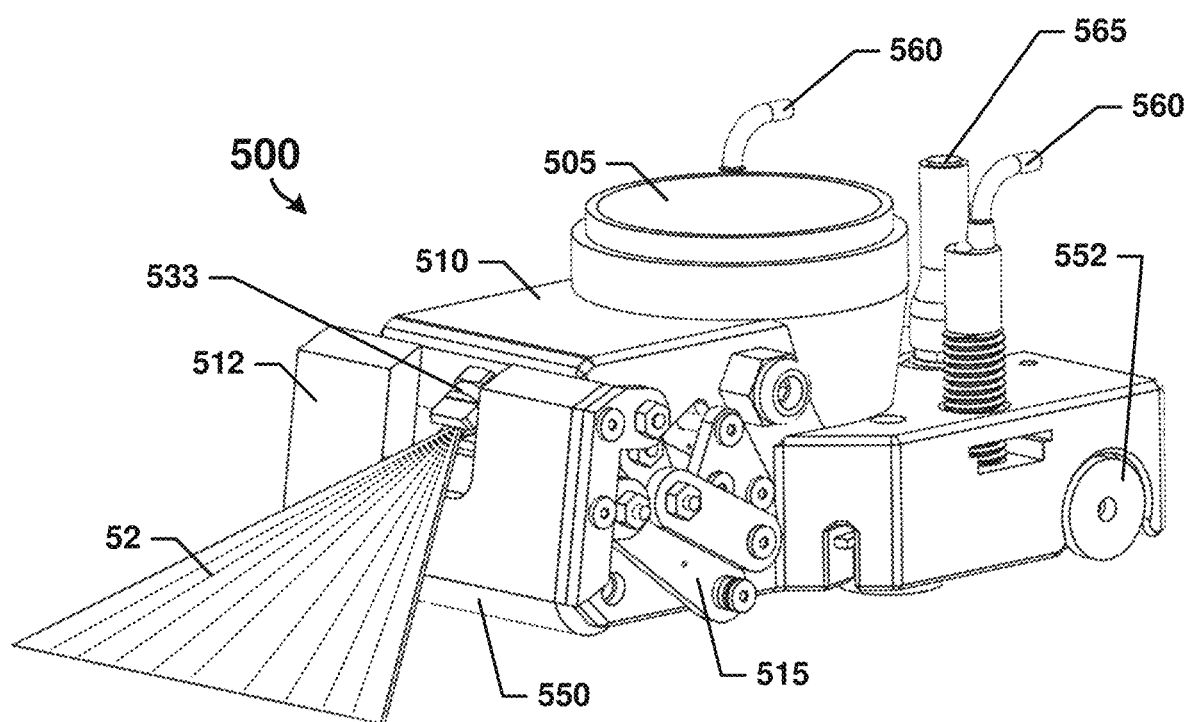

In accordance with various embodiments, the fluid evacuation port 540 may be formed as another open side of the inner chamber 520 (e.g., the right side in the orientation shown in FIGS. 5A, 5D, and 5E). However, the fluid evacuation port 540 may be significantly smaller than the opening on the bottom side 511 that is configured to face the surface being scanned. Alternatively, the fluid evacuation port 540 may include a plurality of ports along the back side of the inner chamber 520. In addition, or as a further alternative, the fluid evacuation port 540 may include a flexible covering flap or skirt 527 configured to allow fluid or a fluid mixture to readily flow out of the inner chamber 520 but restrict or prevent fluid or contaminants from flowing into the inner chamber 520 through the fluid evacuation port 540. The UT scanner interface 500 can benefit from a larger fluid evacuation port 540, since it does not rely upon negative fluid pressure being maintained inside the inner chamber 520.

As the UT scanner interface 500 is lowered onto a target surface (e.g., the bottom of an oil tank), the inner chamber 520 will fill with fluid that was located where the UT scanner interface 500 landed. The couplant from the couplant injection port 530 may be supplied under relatively low pressure into the inner chamber 520, which will enter the inner chamber 520, mix with the fluid already present within the inner chamber 520, and supply pressure that pushes the fluid mixture already in the inner chamber 520 out the fluid evacuation port 540. By continuing to feed couplant into the inner chamber 520, after some time the fluid within the inner chamber 120 will consist primarily of couplant. In this way, couplant integrity between the UT scanner 570 and the target surface may be maintained.

Various embodiments ensure a precise pressure and resulting flow rate of couplant injected into the inner chamber 520, and particularly across the measuring head of a UT scanner 570. Couplant injected into the inner chamber may generate a lifting force encouraging the separation of the main body 510 from the surface being scanned. Thus, if the pressure of the couplant injected into the inner chamber 520 is too high, the resultant measurement signals from the UT scanner 570 may be distorted or lost entirely. Although various embodiments may include means for generating an engagement force with the surface being scanned, to counter the lifting force from the injected couplant, these forces can be balanced to ensure the main body 510 stays in contact with the surface being scanned. Additionally, if the pressure and resulting flow rate of the couplant across the measuring head of the UT scanner 570 is too low, debris and other contaminants may not be properly cleared from the space between the measuring head and the surface being scanned. Examples of suitable pressure for the injected couplant, in accordance with various embodiments, may be at least 5 psi above the head pressure that might be present and up to 40 psi above the head pressure, including any range using the foregoing as upper and/or lower limits, for example the pressure may range from about 5 to 40 psi above the head pressure.

As particularly shown in FIGS. 5B, 5D, and 5E, the inner chamber 520 may include an inner nozzle 531 within the couplant injection port 530. The couplant injection port 530 and the inner nozzle 531 may be located in a front wall 521 of the inner chamber 520. The inner nozzle 531 may be configured to direct couplant to flow from a front side (i.e., the side with the front wall 521) of the inner chamber 522 toward a rear side of the inner chamber 522 opposed to the front side (i.e., the side with the fluid evacuation port 540). In this way, couplant may initially flow into a first inner chamber section 520-A and then a second inner chamber section 520-B.

The inner nozzle 531 may generate an inner couplant spray 54 that fans out from the inner nozzle 531. The inner nozzle 531 may be configured to face slightly downward, as well as toward the fluid evacuation port 540. In various embodiments, the fan configuration of the inner couplant spray 54 may be at least as wide as a measurement head of the UT scanner 570 by the time the inner couplant spray 54 reaches the second inner chamber section 520-B, where the UT scanner 570 is located. The second inner chamber section 520-B extends across the measurement head of the UT scanner 570 and includes the fluid evacuation port 540 on one side thereof. In accordance with various embodiments, the first inner chamber section 520-A may have fanned-out shape that matches or nearly matches the configuration of the inner couplant spray 54. This fanned-out shape may help avoid dead-zones within the inner chamber 520. In this way, a lateral width of the inner chamber 520 expands from a front of the inner chamber 520 toward a back of the inner chamber 520. In addition, the first inner chamber section 520-A may have a tapered ceiling 523 with a first depth $h_1$ that extends higher on a side in which the inner nozzle 531 is located (e.g., the front) than a second depth $h_2$ that is lower on an opposed side 525 where the second inner chamber section 520-B begins. In this way, a vertical height of the inner chamber 520 may narrow from a front of the inner chamber 520 toward a back of the inner chamber 520. This tapered profile, which narrows from a front of the inner chamber 520 toward a back of the inner chamber 520, may counter-balance the effects of the fanned-out shape, which widens from front to back. Together the tapered profile in combination with the fanned-out shape may maintain a generally constant pressure and couplant velocity within the inner chamber 520, at least until the fluid mixture becomes an exit flow $F_O$ at the fluid evacuation port 540. This generally constant pressure within the inner chamber 520 may not only move couplant, as well as other debris or contaminants, through the inner chamber 520 but also may move that fluid mixture evenly and help remove most if not all particulate from the inner chamber 520, and particularly the second inner chamber section 520-B. In contrast to the first inner chamber section 520-A, the second inner chamber section 520-B may have a generally constant cross-sectional shape, which may also promote a constant and steady flow of fluid mixture therethrough. The second inner chamber section 520-B may correspond to a filtered region below the UT scanner 570. In this way, the second inner chamber section 520-B may include a generally horizontal ceiling 572 in which the head of the UT scanner 570 may be seated. Also, by being located in the second inner chamber section 520-B the UT scanner 570 may be disposed facing into the inner chamber 520 closer to the rear side of the inner chamber 520 than the front side of the inner chamber 520.

Various embodiments are configured to operate in crude oil tanks, which tend to have a bottom layer of sludge, sediment, and scale. The scale is a layer of hardened material which needs to be removed along with the sludge and sediment in order to get an accurate UT reading. The pressure generated from the inner couplant spray 54 ejected by the inner nozzle 531 in the inner chamber 520, which is relatively low pressure, may remove loose material but will not generally remove compacted material like scale. Thus, to facilitate the removal of scale and other hardened materials from the surface to be scanned, various embodiments include a forward-facing fluid ejection port 532 with a forward-facing high-pressure nozzle 533. The forward-facing high-pressure nozzle 533 is an external nozzle configured to eject fluid forward of the main body. The forward-facing high-pressure nozzle 533 may be configured to spray a high-pressure jet 52 of fluid in front of the UT scanner interface 500 and downward toward the surface that lies ahead of the UT scanner interface 500. The pressure of the high-pressure jet 52 may be, for example, at least 100 psi, at least 200 psi, at least 300 psi, at least 400 psi, at least 500 psi, at least 600 psi, or up to for example, 1000 psi, up to 900 psi, up to 800 psi, up to 700 psi, including any range using the foregoing as upper and/or lower limits, for example the pressure may range from about 100-1000 psi. The high-pressure jet 52 may be configured to loosen material and reduce the likelihood of particulate entering the inner chamber and thereby promote better readings by the UT scanner 570.

Figures 6A, 6B, 6C:
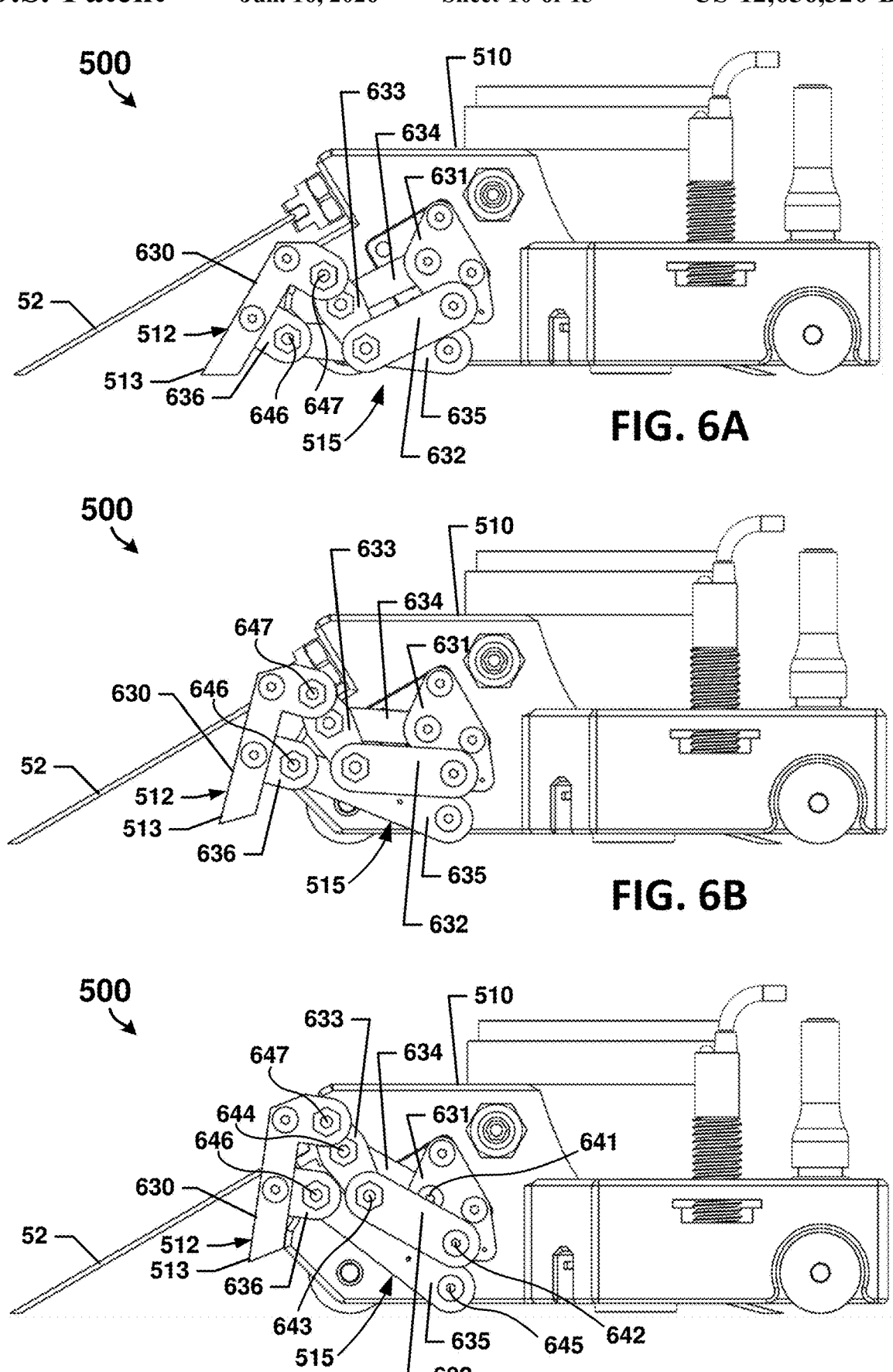
FIGS. 6A-6C are side elevation views of the UT scanner interface of FIGS. 5A-5G with a plow in lowered, intermediate, and raised positions, respectively, in accordance with various embodiments.

FIGS. 6A-6C illustrate aspects of a retractable plow 512 for the UT scanner interface, in accordance with various embodiments. Many tanks or containers suitable for being scanned by the UT scanner interface 500 may have structures or elements contained therein, and particularly on the floor thereof, that may potentially form obstacles that can block or stop the UT scanner interface 500. Thus, various embodiments may include the retractable plow 512, which may be configured to move relative to the main body 510 between a lowered position and a raised position. The retractable plow 512 may be configured to detect when such obstacles are encountered. In addition, the retractable plow 512 may also be configured to deflect debris, sludge, sediment, and/or scale out of the way as the UT scanner interface 500 moves forward along the surface to be scanned (i.e., within the complex environment).

In accordance with various embodiments, the retractable plow 512 may include a multi-bar linkage 515 that is configured to not only allow a plow blade 630 of the retractable plow 512 to lift but may also be configured to selectively lift based on a direction and location of force applied thereto. The plow blade 630 may have an outer face that is slightly inclined for deflecting debris.

The multi-bar linkage 515 may operate as a kinematic chain with multiple rigid links connected by joints to provide constrained motion. The constrained motion may be designed to lift the plow vertically, rather than in an arc that extends both upward and backward. The geometry of the linkages 631, 632, 633, 634, 635, 636 and articulating joints 641, 642, 643, 644, 645, 646, 647 of the multi-bar linkage 515 may be configured to maintain the plow blade 630 in a lowest position (e.g., shown in FIG. 6A) when the angled face of the plow blade 630 pushes sludge or other sediment out of the way. Additionally, the multi-bar linkage 515 may also be configured to lift the plow blade 630 vertically toward the highest position (e.g., shown in FIG. 6C) when the front plow tip 613 is pushed with a predetermined amount force. A pair of springs or similar resistance mechanism may be calibrated to the predetermined amount of force to maintain the plow blade 630 in the lowered position unless the predetermined force is exceeded. The predetermined amount of force may be greater than an amount of distributed force imparted on the rest of the plow blade 630.

When the retractable plow 512 runs into an obstacle, that obstacle will exert a force on the leading edge of the retractable plow 512. The force from an obstacle, such as a fixed or heavy obstacle, on the leading edge 513 will generally be significantly higher than the force exerted by debris on the rest of the plow blade 630. Thus, in accordance with various embodiments, the multi-bar linkage 515 is configured to automatically lift the plow blade 630 in response to a force above a threshold value being applied horizontally to the leading edge 513. Thus, a general force applied to the inclined surface of the plow blade 630, such as from sediment, may not cause the plow blade 630 to lift. In contrast, a greater force applied to the leading edge 513, such as from an obstacle, may cause the plow blade 630 to lift as a result of the geometry of individual elements forming the multi-bar linkage 515 and/or a spring mechanism. The threshold of the amount of force may be adjusted manually by swapping out or tensioning springs. Lower resistance to lifting may result in false triggers and higher resistance may overload the multi-bar linkage 515 and/or servo motors incorporated therein. For example, the multi-bar linkage 515 and/or a set of springs incorporated therein may be calibrated to resist forces of at least 50 g, at least 100 g, at least 200 g, at least 400 g, at least 600 g, at least 800 g, at least 1,000 g or up to for example 2000 g, up to 1800 g up to 1600 g, up to 1400 g, up to 1200 g. The expected minimum would be 50 g and the maximum would be 2000 g, including any range using the foregoing as upper and/or lower limits, for example the force may range from about 50 g-2000 g.

In addition, the articulating joints 641, 642, 643, 644, 645, 646, 647 may be configured to allow the plow blade 630 to pivot, but to restrict and direct that pivotal movement vertically, rather than horizontally. A horizontal pushing force, such as one that may occur when the front plow tip 613 runs into something heavy (e.g., large debris) or fixed (e.g., a rivet, bolt, or other structure or fixed element), will cause the plow blade 630 to lift vertically.

When an object imparts a rearward force on the front plow tip 613, that force will translate into a rotational force at the forward hinge 646 (e.g., in the counter-clockwise direction in the orientation shown in FIGS. 6A-6C). The rotational force at the forward hinge 646 will in-turn impart a force at the upper hinge 647 in the forward direction (e.g., to the left in the orientation shown in FIGS. 6A-6C). However, movement of the upper hinge 647 is constrained by central linkages 632, 633, 634 that will only allow the upper hinge 647 to move in a direction in-line with articulating joints hinges 643, 644 and hinge 647, which may be substantially vertically. The length of each linkage 631, 632, 633, 634, 635, 636 makes a difference in enabling the plow blade 630 to lift when it encounters an obstacle. Shorter linkages can provide more rotation, but less deflection at the end. Additionally, the use of bronze bushings for moving parts, such as between the linkages 631, 632, 633, 634, 635, 636 and articulating joints 641, 642, 643, 644, 645, 646, 647, may help avoid sparks.

An encoder may measure motion of the retractable plow 512 based on movement of the multi-bar linkage 515. For example, an internal encoder may be included that is configured to measure the amount of rotation/movement in one or more linkages 631, 632, 633, 634, 635, 636 and articulating joints 641, 642, 643, 644, 645, 646, 647. For example, an encoder that measures a number of points within thirty degrees (30°) can measure a small fraction of a degree of rotation in articulating joints 641, 642, 643, 644, 645, 646, 647. The number of points within a given angle of rotation that an encoder can measure depends on the resolution or number of pulses per revolution of the encoder. For example, a 12 bit encoder may calibrate a maximum angle to be 18 degrees to result in 0.0044 degree least significant bits (LSB).

The encoder may provide measurements to identify the height of an obstacle, which information may be stored and used for path planning, obstacle avoidance, and/or as a landmark for determining a position of the UT scanner interface 500. When an obstacle exerts a threshold amount of force on the leading edge 513, that force will cause the plow blade 630 to lift. Once the leading edge 513 lifts high enough to clear the obstacle, that obstacle will no longer exert a force on the plow blade 630 and the plow blade 630 will stop rising. Thus, the encoder may measure how high the plow blade 630 rose in order to determine or identify what type of obstacle was encountered. For example, obstacles may be identified by category so that obstacles that are shorter than a predetermined height (e.g., 0.5") may fall into one category and obstacles equal to or higher than the predetermined height fall into a second category. For example, obstacles lower than 0.5" may correspond to bolts, rivets, or other common small, fixed elements inside tanks. In addition, obstacles equal to or higher than the 0.5" may correspond to any one of the side walls of the tank being inspected or other large structure therein. One or more of various types of encoders may be used, such as magnetic encoders, optical encoders, quadrature encoders. The magnetic encoder may be useful in that it may provide low friction and minimal contact with surfaces, allowing it to be waterproof and work in hostile environments without getting compromised or needing to be recalibrated often.

In accordance with various embodiments, the UT scanner interface 500 may include one or more inductive sensors 584, 586 (see FIGS. 5B, 5D) configured to measure distance to the scanned surface. The power and/or signals from the inductive sensors 584, 586 may be supplied through additional tether lines 585, 587. Alternatively, the inductive sensors 584, 586 may share power and/or signals through lines supplied to other components of the UT scanner interface 500, such as through the robotic arms (e.g., robotic arm 440). Inductive sensors detect the presence or absence of metallic objects within their sensing range, such as the scanned surface of a crude oil tank. By analyzing the magnitude and frequency of the induced current in the inductive sensors 584, 586, a processor may determine the proximity and characteristics of the metal surface being scanned.

By including an inductive sensor 584 on one side of the main body 510 and a second inductive sensor 586 on an opposed second side of the main body 510, the pair of inductive sensors 584, 586 may be configured to detect not only whether the main body 510 is separating from the scanned surface, but also whether one side of the main body 510 is lifting relative to the other. Thus, the inductive sensors 584, 586 may be configured to measure an altitude and attitude of the UT scanner interface 500. Alternatively, more than two inductive sensors 584, 586 may be used to enable the detection of pitch changes, in addition to roll.

Alternatively, or additionally, for tanks not composed of metal or with non-metal surface layers that could interfere with inductive sensors, other sensors could be used. For example, physical touch sensors, laser distance sensors, potentiometer-based sensors and/or lidar sensors may be used.

Various embodiments may include a UT scanner interface 100 that uses one or more alternative means for generating an engagement force that biases the UT scanner interface toward the surface of the target material for inspection. In particular, some embodiments may include one or more electromagnets 580, 582 configured to produce a magnetic field for biasing a main body 510 of the UT scanner interface 100 toward a ferrous material being scanned by the UT scanner 570.

The flow of couplant under the UT scanner 570 (e.g., inside the inner chamber 220) may tend to push the main body 510 up and away from the scanned surface. The main body 510 separating from the scanned surface may lead to inaccurate measurements since the UT scanner 570 may be sensitive to distance and attitude relative to the scanned surface. Additionally, as the main body 510 moves away from the scanned surface, a gap forms under the bottom side 511 through which debris or other contaminants may enter the inner chamber 520, and particularly between the head of the UT scanner 570 and the scanned surface. Various embodiments address this problem by incorporating the electromagnets 580, 582 into the base of the main body 510. In this way, the UT scanner interface 500 may include means for generating an engagement force that biases the UT scanner interface toward the surface being scanned using electromagnets 580, 582. The electromagnets 580, 582 may selectively generate a magnetic field that interacts with the surface being scanned, which is often made of ferrous materials, resulting in an attractive force that holds the main body 510 firmly in place over the surface being scanned.

The main body 510 may include a robot coupling 505 configured to attach to the robot (e.g., robot 410 in FIG. 4A) through a robotic arm. Having a tethered link between the robot and the main body 510 enables a large area of tank to be scanned after a single motion of the robot. The robot may move into position, with the main body 510 located over a section to be scanned, and then the electromagnets 580, 582 may be engaged and the inner couplant spray 54 initiated before the scanning by the UT scanner 570. Once the requisite number of scans of that section are complete, the electromagnets 580, 582 may be disengaged and the main body 510 may be moved by the robotic arm without having to move the robot. Alternatively, the main body 510 may include its own propulsion means, such as motorized wheels or external fluid jets. Once the main body 510 is relocated, the electromagnets 580, 582 may reengage and the inner couplant spray 54 re-initiated for more scanning.

Additionally, the UT scanner interface 500 may include one or more additional tethers, such as one or more couplant supply lines connected to a fluid injection port 560, a power/data line 565 coupled to the UT scanner 570, or the additional tether lines 585, 587 for the inductive sensors 584, 586. The one or more couplant supply lines may supply the inner couplant spray 54, as well as the supply of couplant ejected from other ports (e.g., the couplant injection port 530 and/or the high pressure jet 780).

Powerful permanent magnets, such as neodymium magnets, may be used as the electromagnets 580, 582 due to their strong magnetic properties. As the main body 510 is positioned close to the surface intended to be scanned, the electromagnets 580, 582 may generate a magnetic field that interacts with the ferromagnetic properties of the surface material, such as iron or steel. The magnetic field induces an attractive force between the magnets and the surface, creating a strong bond. This force helps maintain contact or proximity, preventing slippage or detachment. To control the magnetic force and enable the main body 510 to move or detach, when necessary, various mechanisms can be incorporated. For example, the main body 510 may include mechanisms for adjusting the distance between the electromagnets 580, 582 and the surface being scanned, a controller in the main body 510 or elsewhere may control the current to the electromagnets 580, 582 and/or may control a deployment/retraction mechanism, or the main body 510 may include deployable/retractable magnetic shielding materials to reduce or redirect the magnetic field.

In various embodiments, the main body 510 may include rollers/wheels 550, 552, 554 configured to keep the main body 510 sliding smoothly over the surface and keep the correct attitude and distance from the floor. In addition, rollers/wheels 550, 552, 554 may assist the UT scanner interface 500 in traversing uneven surfaces. The rollers/wheels 550, 552, 554 may help the main body 510 move smoothly while the electromagnets 580, 582 are engaged and keeping the system in tight contact with the scanned surface. The rollers/wheels 550, 552, 554 may be free-spinning cylinders. Alternatively, the rollers/wheels 550, 552, 554 may be driven by a motor or hydraulics. The rollers/wheels 550, 552, 554 may be rubber or at least have an outer rubber coating for better traction. As a further alternative or addition, the rollers/wheels 550, 552, 554 may have outer surface treatments, such as knobs, treads, grooves, or the like to improve traction.

Alternatively, one or more of the rollers/wheels 550, 552, 554 may be magnetized in place of or in addition to the electromagnets 580, 582. As additional magnets to the electromagnets 580, 582, the rollers/wheels 550, 552, 554 may be selectively activated, such as being activated when the main body 510 is being moved. In this way, the rollers/wheels 550, 552, 554 may be designed with built-in compartments or recesses to house the magnets securely. These compartments ensure proper alignment and allow the magnetic field to interact effectively with the surface when energized. Alternatively, one or all of the rollers/wheels 550, 552, 554 may be replaced with skids, either magnetized or non-magnetized.

Additionally, or as a further alternative, the UT scanner interface 500 may include means for generating an engagement force that biases the UT scanner interface toward the surface being scanned using high pressure jets directing a fluid flow upwards, which imparts a downward force that keeps the main body 510 in contact with the floor (i.e., the surface being scanned).

Figure 7A:
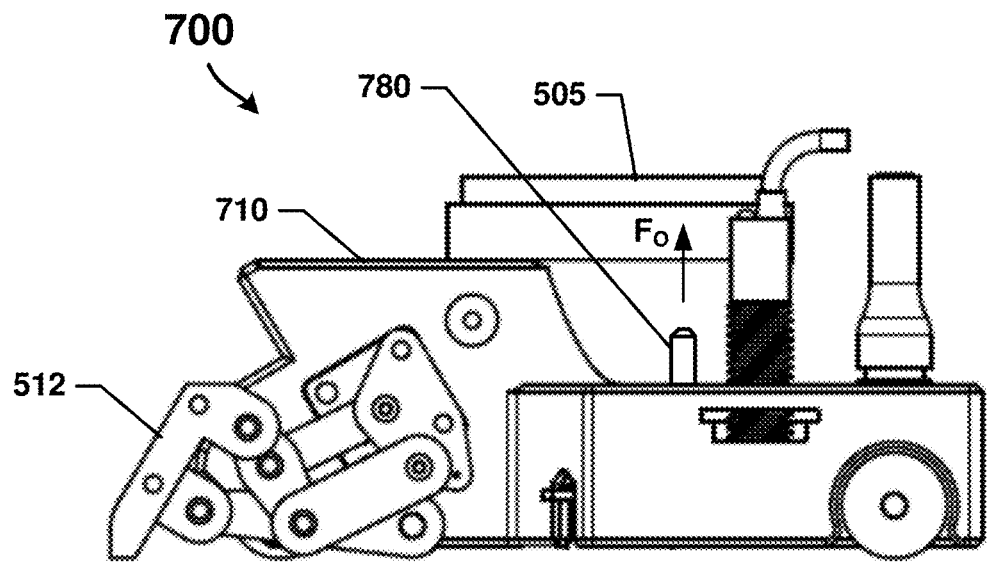
FIGS. 7A-7B are side elevation and top perspective views of a UT scanner interface with upwardly oriented external high pressure jets, in accordance with various embodiments.
Figure 7B:
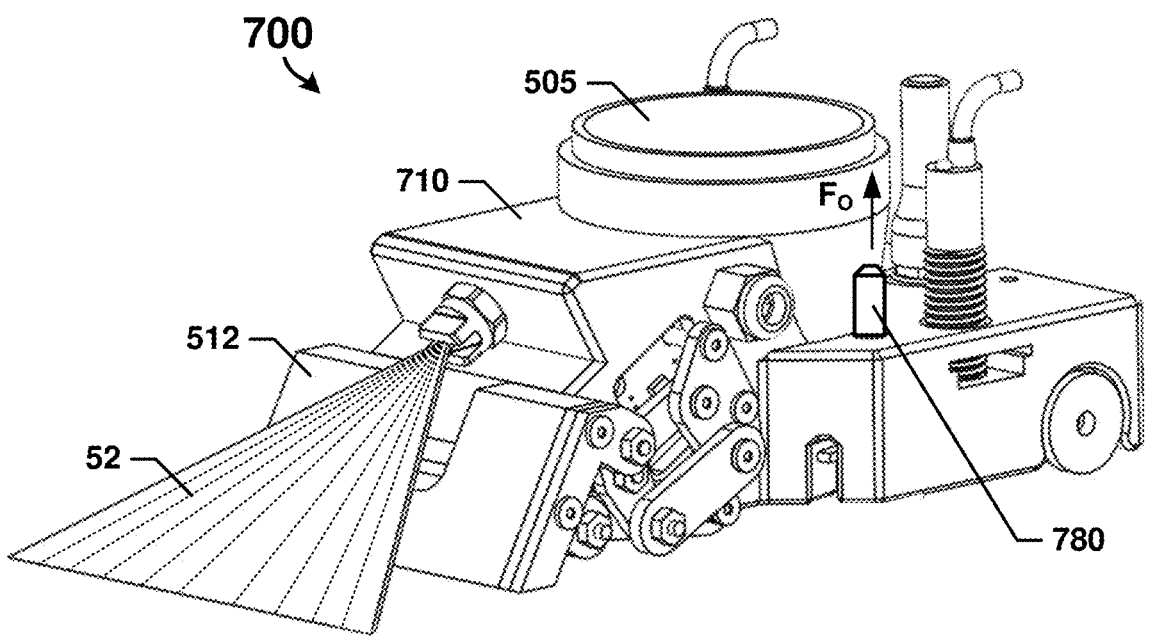

FIGS. 7A-7B illustrate a UT scanner interface 700 for complex environments in accordance with various embodiments. In particular, the UT scanner interface 700 includes a main body 710 with at least one upwardly facing high pressure jet 780. The high pressure jet 780 may be configured to expel an outward flow $F_O$ in an upward direction that imparts a downward force on the main body 710. Thus, the high pressure jet 780 may be an external nozzle configured to eject fluid in a direction away from the UT scanner for biasing the main body 710 toward the material being scanned. More than one high pressure jet 780 may be provided to impart a downward force more evenly on the main body 710 when necessary. For example, two high pressure jets 780 may be disposed on either side of the robot coupling 505, which is centrally located. Additionally, more high pressure jets or one or more jets in different locations may be used.

FIGS. 8A-8D are process flow diagrams illustrating example methods 800-803 of performing a UT scan in a complex environment in accordance with various embodiments. With reference to FIGS. 8A-8D, the methods 800-803 and the operations thereof may be performed using a UT scanner interface (e.g., 100) configured to perform UT scans within a complex environment. In some embodiments, the methods 800-803 may be performed with the assistance of a robot (e.g., 410) configured to maneuver through viscous mixtures. The operations of the methods 800-803 may be controlled by an operator or performed by a processor of the UT scanner interface, the robot, or a combination thereof. In this way, the UT scanner interface may be run as a non-autonomous, semi-autonomous, or fully autonomous device.

Referring to FIG. 8A, in the method 800, the UT scanner interface described herein may be positioning over a surface of a target material (e.g., 10) for inspection in block 810. The UT scanner interface may hold a UT scanner (e.g., 170, 570). The target material may be submerged in a complex environment composed of a primary fluid (e.g., 55) and contaminants (e.g., 20). The UT scanner may be held in a main body of the UT sensor interface such that the UT scanner faces into the inner chamber and toward an opening on a bottom side of the inner chamber. For example, the UT scanner interface may be lowered onto the bottom of a crude oil tank or maneuvered inside of a crude oil pipe and positioned over a section of the tank or pipe intended to be scanned using the UT scanner mounted in the UT scanner interface. In this way, the primary fluid may be oil held within the tank or pipe.

In block 812, a couplant may be injected into the inner chamber. The couplant may be the primary fluid (e.g., oil) pumped into the inner chamber from a higher level of the vessel (i.e., the tank or pipe) being scanned. Alternatively, couplant may be pumped into the inner chamber from outside the vessel, and may be a fluid other than the fluid in the tank being inspected.

In block 814, an engagement force that biases the UT scanner interface toward the surface of the target material for inspection may be generated. For example, the engagement force may be generated by fluid suctioned from the inner chamber to form a filtered region below a measuring head of a UT scanner within an inner chamber of the UT scanner interface. The fluid suctioned from the inner chamber may include couplant (i.e., the primary fluid) and fluid from within the tank including contaminants. For example, the fluid removed from the inner chamber may be a mix of primary fluid and contaminants (e.g., sediment, sludge, and/or biofouling). The fluid may be removed from the inner chamber for filtering contaminants out of the filtered region. In various embodiments, a pressure differential between the injected couplant in block 812 and suctioning fluid from the inner chamber in block 814 may generate a net negative pressure within the inner chamber that pulls the UT scanner interface toward the target material (i.e., the surface being scanned). As another example, the engagement force may be generated by powering an electromagnet configured to draw the UT scanner interface toward the surface of the target material for inspection. As yet another example, the engagement force may be generated by ejecting fluid from the UT scanner interface in a direction away from the surface of the target material for inspection (e.g., upwardly away from a floor of the tank).

In block 816 the UT scanner may be activated to perform a UT scan of the target material through couplant in the inner chamber. The active scanning by the UT scanner, following the injection of couplant in block 812 and the removal of fluid with contaminants in block 814 may ensure couplant integrity within the filtered region or at least the inner chamber of the UT scanner interface.

Referring to FIG. 8B, in the method 801, following the operations in block 816 of the method 800, the UT scanner interface may be moved within the complex environment in block 818. Such movement may cause a pair of rollers, mounted to the main body of the UT scanner interface, to roll in the direction of the movement. The rollers may flank two lateral sides of the inner chamber and bound opposed sides of the filtered region underneath the UT scanner interface. For example, a robot (e.g., 410) may maneuver within the complex environment to pull or push the UT scanner interface to a select portion of the target material being scanned. In this way, multiple portions of the target material may be scanned. For example, the entire bottom of a crude oil tank or an entire length of pipe may be scanned incrementally. Following the operations in block 818, the method may perform the operations in block 812 of the method 800 as described.

Referring to FIG. 8C, in the method 802 following the operations in either block 816 of the method 800 or block 818 of the method 801, the UT scanner interface may be moved within the complex environment to a target area of the target material for scanning in block 820. The couplant integrity may be maintained in the filtered region underneath the UT scanner interface in part by a pair of flexible skirts extending from lower edges of the inner chamber. Following the operations in block 820, the method may perform the operations in block 812 of the method 800 as described.

Referring to FIG. 8D, in the method 803, the UT scanner interface may be coupled to a remote source of the primary fluid in block 822. For example, the UT scanner interface may be connected to a float with a hose or just connected to a buoyant hose for supplying fresh couplant to the UT scanner interface. In block 824, primary fluid may be conveyed to the UT scanner interface while pumping the primary fluid into the inner chamber. Following the operations in block 824, the method may perform the operations in block 810 of the method 800 as described.

Referring to FIG. 8E, in the method 804 following the operations in any of blocks 816 of the method 800, block 818 of the method 801, or block 820 of the method 802, the UT scanner interface may measure movement of a retractable plow (e.g., using an encoder) relative to the main body to identify an obstacle that has contacted the retractable plow.

Implementation examples are described in the following paragraphs.

Example 1. A UT scanner interface for complex environments, comprising a main body that comprises an inner chamber open on a bottom side, wherein the main body is configured to hold a UT scanner facing into the inner chamber and toward the opening on the bottom side; a couplant injection port configured to inject a couplant into the inner chamber; and a fluid evacuation port configured to remove fluid from the inner chamber, wherein the fluid removed from the inner chamber includes at least some of the couplant injected into the inner chamber.

Example 2. The UT scanner interface of example 1, wherein the couplant injection port is coupled to a series of inlet ports disposed along an outer edge of the opening on the bottom side and configured to distribute couplant supplied from the couplant injection port into the inner chamber.

Example 3. The UT scanner interface of example 2, wherein the series of inlet ports are at least one of disposed outside the inner chamber, facing in the same direction as the UT scanner, or disposed on opposite sides of the inner chamber.

Example 4. The UT scanner interface of at least one of examples 1-3, wherein the fluid evacuation port is coupled to a series of outlet ports disposed adjacent the inner chamber and configured to receive couplant supplied to the inner chamber.

Example 5. The UT scanner interface of example 4, wherein the series of outlet ports are distributed along opposing sides of the UT scanner within the inner chamber.

Example 6. The UT scanner interface of at least one of examples 1-5, further comprising a pair of rollers disposed on opposed sides of the opening on the bottom side, wherein each of the pair of rollers is configured to engage a surface for scanning by the UT scanner.

Example 7. The UT scanner interface of example 6, wherein the main body further comprises a pair of roller cavities each configured to house one of the pair of rollers, wherein the pair of roller cavities are disposed on opposite sides of the inner chamber.

Example 8. The UT scanner interface of example 7, wherein the main body further comprises a fluid supply port configured to supply the pair of roller cavities with fluid for lubricating the pair of rollers.

Example 9. The UT scanner interface of at least one of examples 1-8, wherein a lower edge of at least one side wall of the main body includes a flexible skirt configured to shield fluid or sediment at least partially from entering the inner chamber.

Example 10. The UT scanner interface of at least one of examples 1-9, wherein the main body includes at least one inclined lateral wall on an outside of the main body extending between a bottom of the main body and a top of the main body for deflecting sediment as the main body moves within a complex environment.

Example 11. The UT scanner interface of at least one of examples 1-10, wherein the main body includes a retractable plow configured to move relative to the main body between a lowered position and a raised position.

Example 12. The UT scanner interface of example 11, wherein the retractable plow is configured to move from the lowered position to the raised position in response to a force above a threshold being applied horizontally to a leading edge of the retractable plow.

Example 13. The UT scanner interface of at least one of examples 1-12, wherein the couplant injection port is coupled to an aperture, into the inner chamber, that is configured to direct the couplant to flow from a front side of the inner chamber toward a rear side of the inner chamber opposed to the front side.

Example 14. The UT scanner interface of example 13, wherein the fluid evacuation port is disposed on the rear side of the inner chamber.

Example 15. The UT scanner interface of example 13, wherein the inner chamber is open on the rear side such that the opening on the rear side forms the fluid evacuation port.

Example 16. The UT scanner interface of example 13, wherein the UT scanner is disposed facing into the inner chamber closer to the rear side of the inner chamber than the front side of the inner chamber.

Example 17. The UT scanner interface of at least one of examples 1-16, wherein a vertical height of the inner chamber narrows from a front of the inner chamber toward a back of the inner chamber.

Example 18. The UT scanner interface of at least one of examples 1-17, wherein a lateral width of the inner chamber expands from a front of the inner chamber toward a back of the inner chamber.

Example 19. The UT scanner interface of at least one of examples 1-18, wherein the main body further comprises an external nozzle configured to eject fluid forward of the main body.

Example 20. The UT scanner interface of at least one of examples 1-19, wherein the main body further comprises an electromagnet configured to produce a magnetic field for biasing the main body toward a ferrous material being scanned by the UT scanner.

Example 21. The UT scanner interface of at least one of examples 1-20, wherein the main body further comprises an external nozzle configured to eject fluid in a direction away from the surface being scanned by the UT scanner for biasing the main body toward a material being scanned.

Example 22. The UT scanner interface of at least one of examples 1-21, wherein the main body further comprises an inductive sensor configured to detect a distance of the main body relative to a surface being scanned by the UT scanner.

Example 23. The UT scanner interface of at least one of examples 1-22, further comprising the UT scanner secured to the main body.

Example 24. A method of performing a UT scan in a complex environment, positioning a UT scanner interface that holds a UT scanner over a surface of a target material for inspection, wherein the target material is submerged in the complex environment composed of a primary fluid and contaminants, wherein the UT scanner is held in a main body of the UT scanner interface such that the UT scanner faces into an inner chamber of the main body and toward an opening on a bottom side of the inner chamber; injecting a couplant into the inner chamber; generating an engagement force that biases the UT scanner interface toward the surface of the target material for inspection; and activating the UT scanner to perform the UT scan of the target material through couplant in the inner chamber.

Example 25. The method of example 24, wherein generating the engagement force includes suctioning fluid from the inner chamber to form a filtered region below the UT scanner interface, wherein the fluid suctioned from the inner chamber includes at least one of couplant and contaminants for filtering out contaminants from the filtered region.

Example 26. The method of at least one of examples 23 or 24, wherein a pressure differential between the injected couplant and suctioning fluid from the inner chamber form a net negative pressure within the inner chamber that pulls the UT scanner interface toward the target material.

Example 27. The method of at least one of examples 23-26, wherein generating the engagement force includes powering an electromagnet configured to draw the UT scanner interface toward the surface of the target material for inspection.

Example 28. The method of at least one of examples 23-27, wherein generating the engagement force includes ejecting fluid from the UT scanner interface in a direction away from the surface of the target material for inspection.

Example 29. The method of at least one of examples 23-28, further comprising coupling the UT scanner interface to a remote source of the primary fluid; and conveying the primary fluid to the UT scanner interface while pumping the primary fluid into the inner chamber.

Example 30. The method of at least one of examples 23-29, further comprising measuring movement of a retractable plow relative to the main body to identify an obstacle that has contacted the retractable plow.

The foregoing descriptions of systems, devices, and methods are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are used to guide the reader through the description of the methods. Further, any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An ultrasonic nondestructive testing (UT) scanner interface for complex environments, comprising:

a main body comprising:

an inner chamber open on a bottom side, wherein the main body is configured to hold a UT scanner facing into the inner chamber and toward the opening on the bottom side;

a couplant injection port configured to receive a couplant pumped under pressure into the inner chamber; and a fluid evacuation port configured to remove fluid from the inner chamber, wherein the fluid removed from the inner chamber includes at least some of the couplant injected into the inner chamber, wherein the main body is configured to be submerged in a complex environment composed of a primary fluid and contaminants that interfere with UT scanning, wherein the primary fluid is at least partly a liquid, and wherein the couplant includes at least some of the primary fluid.

2. The UT scanner interface of claim 1, wherein the couplant injection port is coupled to a series of inlet ports disposed along an outer edge of the opening on the bottom side and configured to distribute couplant supplied from the couplant injection port into the inner chamber.

3. The UT scanner interface of claim 2, wherein the series of inlet ports are at least one of disposed outside the inner chamber, facing in the same direction as the UT scanner, or disposed on opposite sides of the inner chamber.

4. The UT scanner interface of claim 1, wherein the fluid evacuation port is coupled to a series of outlet ports disposed adjacent the inner chamber and configured to receive couplant supplied to the inner chamber.

5. The UT scanner interface of claim 4, wherein the series of outlet ports are distributed along opposing sides of the UT scanner within the inner chamber.

6. The UT scanner interface of claim 1, further comprising:

a pair of rollers disposed on opposed sides of the opening on the bottom side, wherein each of the pair of rollers is configured to engage a surface for scanning by the UT scanner.

7. The UT scanner interface of claim 6, wherein the main body further comprises a pair of roller cavities each configured to house one of the pair of rollers, wherein the pair of roller cavities are disposed on opposite sides of the inner chamber.

8. The UT scanner interface of claim 7, wherein the main body further comprises a fluid supply port configured to supply the pair of roller cavities with fluid for lubricating the pair of rollers.

9. The UT scanner interface of claim 1, wherein a lower edge of at least one side wall of the main body includes a flexible skirt configured to shield fluid or sediment at least partially from entering the inner chamber.

10. The UT scanner interface of claim 1, wherein the main body includes at least one inclined lateral wall on an outside of the main body extending between a bottom of the main body and a top of the main body for deflecting sediment as the main body moves within a complex environment.

11. The UT scanner interface of claim 1, wherein the main body includes a retractable plow configured to move relative to the main body between a lowered position and a raised position.

12. The UT scanner interface of claim 11, wherein the retractable plow is configured to move from the lowered position to the raised position in response to a force above a threshold being applied to a leading edge of the retractable plow.

13. The UT scanner interface of claim 1, wherein the couplant injection port is coupled to an aperture, into the inner chamber, that is configured to direct the couplant to flow from a front side of the inner chamber toward a rear side of the inner chamber opposed to the front side.

14. The UT scanner interface of claim 13, wherein the fluid evacuation port is disposed on the rear side of the inner chamber.

15. The UT scanner interface of claim 13, wherein the inner chamber is open on the rear side such that the opening on the rear side forms the fluid evacuation port.

16. The UT scanner interface of claim 13, wherein the UT scanner is disposed facing into the inner chamber closer to the rear side of the inner chamber than the front side of the inner chamber.

17. The UT scanner interface of claim 1, wherein a vertical height of the inner chamber narrows from a front of the inner chamber toward a back of the inner chamber.

18. The UT scanner interface of claim 1, wherein a lateral width of the inner chamber expands from a front of the inner chamber toward a back of the inner chamber.

19. The UT scanner interface of claim 1, wherein the main body further comprises:

an external nozzle configured to eject fluid forward of the main body.

20. The UT scanner interface of claim 1, wherein the main body further comprises:

a magnet configured to produce a magnetic field for biasing the main body toward a ferrous material being scanned by the UT scanner.

21. The UT scanner interface of claim 1, wherein the main body further comprises:

an external nozzle configured to eject fluid in a direction away from a surface being scanned by the UT scanner for biasing the main body toward a material being scanned.

22. The UT scanner interface of claim 1, wherein the main body further comprises:

an inductive sensor configured to detect a distance of the main body relative to a surface being scanned by the UT scanner.

23. The UT scanner interface of claim 1, further comprising:

the UT scanner secured to the main body.

24. A method of performing a UT scan in a complex environment, comprising:

positioning a UT scanner interface that holds a UT scanner over a surface of a target material for inspection, wherein the target material is submerged in the complex environment composed of a primary fluid and contaminants that interfere with UT scanning, wherein the primary fluid is at least partly a liquid, wherein the UT scanner is held in a main body of the UT scanner interface such that the UT scanner faces into an inner chamber of the main body and toward an opening on a bottom side of the inner chamber;

injecting a couplant under pressure into the inner chamber, wherein the couplant includes at least some of the primary fluid;

generating an engagement force that biases the UT scanner interface toward the surface of the target material for inspection; and activating the UT scanner to perform the UT scan of the target material through couplant in the inner chamber.

25. The method of claim 24, wherein generating the engagement force includes suctioning fluid from the inner chamber to form a filtered region below the UT scanner interface, wherein the fluid suctioned from the inner chamber includes at least one of couplant and contaminants for filtering out contaminants from the filtered region.

26. The method of claim 24, wherein a pressure differential between the injected couplant and suctioning fluid from the inner chamber form a net negative pressure within the inner chamber that pulls the UT scanner interface toward the target material.

27. The method of claim 24, wherein generating the engagement force includes powering an electromagnet configured to draw the UT scanner interface toward the surface of the target material for inspection.

28. The method of claim 24, wherein generating the engagement force includes ejecting fluid from the UT scanner interface in a direction away from the surface of the target material for inspection.

29. The method of claim 24, further comprising:

coupling the UT scanner interface to a remote source configured to intake and convey the primary fluid; and conveying the primary fluid from the remote source to the UT scanner interface, wherein injecting the couplant under pressure into the inner chamber includes pumping the primary fluid as the couplant into the inner chamber.

30. The method of claim 24, further comprising:

measuring movement of a retractable plow relative to the main body to identify an obstacle that has contacted the retractable plow.

\* \* \* \* \*